United States Patent
Mercuri et al.

(10) Patent No.: US 11,121,858 B2
(45) Date of Patent: Sep. 14, 2021

(54) BLOCKCHAIN ANALYTICS

(71) Applicant: Microsoft Technology Licensing, LLC, Redmond, WA (US)

(72) Inventors: Marc E. Mercuri, Seattle, WA (US); Zeyad Rajabi, Seattle, WA (US); Eric I. Maino, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 217 days.

(21) Appl. No.: 15/995,062

(22) Filed: May 31, 2018

(65) Prior Publication Data

US 2019/0012249 A1    Jan. 10, 2019

Related U.S. Application Data

(60) Provisional application No. 62/530,081, filed on Jul. 7, 2017.

(51) Int. Cl.
*G06F 16/00* (2019.01)
*H04L 9/06* (2006.01)
(Continued)

(52) U.S. Cl.
CPC .......... *H04L 9/0637* (2013.01); *G06F 9/451* (2018.02); *G06F 9/542* (2013.01); *G06F 9/546* (2013.01);
(Continued)

(58) Field of Classification Search
CPC ... H04L 9/0637; H04L 9/0643; H04L 9/3236; H04L 9/3239; H04L 9/3242; H04L 9/3247; H04L 9/3265; H04L 63/101; H04L 63/102; H04L 63/123; H04L 2209/38; H04L 2209/56; G06F 9/451; G06F 9/542; G06F 9/546; G06F 16/27; G06F 16/904; G06F 16/212; G06F 11/3072; G06F 11/3476;
(Continued)

(56) References Cited

U.S. PATENT DOCUMENTS 6,161,139 A    12/2000  Win et al.
7,554,542 B1    6/2009  Ferraro et al.
(Continued)

FOREIGN PATENT DOCUMENTS

WO    2017098519 A1    6/2017

OTHER PUBLICATIONS

"Non-Final Office Action Issued in U.S. Appl. No. 15/957,458", dated Feb. 21, 2020, 15 Pages.
(Continued)

*Primary Examiner* — Shiow-Jy Fan
(74) *Attorney, Agent, or Firm* — Mannava & Kang, P.C.

(57) ABSTRACT

A blockchain analytics system facilitates determination of parameters of blockchain objects for analytics. Examples of parameters of the blockchain object may include an identity of a participant, a role of a participant, a type of the blockchain object and the like. The system may store parameters of blockchain objects in the data repository. The system may use the determined parameters to generate a machine learning blockchain analytics model. The system may generate visualizations, detect patterns and/or for detecting anomalies based on the machine learning blockchain analytics model.

20 Claims, 15 Drawing Sheets

(51) Int. Cl.

| | | |
|---|---|---|
| *G06Q 20/06* | (2012.01) | |
| *G06F 21/60* | (2013.01) | |
| *H04L 9/32* | (2006.01) | |
| *G06F 21/64* | (2013.01) | |
| *H04L 29/06* | (2006.01) | |
| *G06Q 20/38* | (2012.01) | |
| *G06Q 20/40* | (2012.01) | |
| *G06Q 20/02* | (2012.01) | |
| *G06F 16/904* | (2019.01) | |
| *G06N 20/00* | (2019.01) | |
| *G06F 11/30* | (2006.01) | |
| *G06F 11/34* | (2006.01) | |
| *G06F 9/451* | (2018.01) | |
| *G06F 16/21* | (2019.01) | |
| *G06F 9/54* | (2006.01) | |
| *G06F 16/27* | (2019.01) | |
| *G06N 3/08* | (2006.01) | |
| *H04W 4/70* | (2018.01) | |

(52) U.S. Cl.
CPC ...... *G06F 11/3072* (2013.01); *G06F 11/3476* (2013.01); *G06F 16/212* (2019.01); *G06F 16/27* (2019.01); *G06F 16/904* (2019.01); *G06F 21/602* (2013.01); *G06F 21/645* (2013.01); *G06N 20/00* (2019.01); *G06Q 20/02* (2013.01); *G06Q 20/06* (2013.01); *G06Q 20/3827* (2013.01); *G06Q 20/405* (2013.01); *H04L 9/0643* (2013.01); *H04L 9/3236* (2013.01); *H04L 9/3239* (2013.01); *H04L 9/3242* (2013.01); *H04L 9/3247* (2013.01); *H04L 9/3265* (2013.01); *H04L 63/101* (2013.01); *H04L 63/102* (2013.01); *H04L 63/123* (2013.01); *G06N 3/08* (2013.01); *G06Q 2220/00* (2013.01); *H04L 2209/38* (2013.01); *H04L 2209/56* (2013.01); *H04W 4/70* (2018.02)

(58) Field of Classification Search
CPC ..... G06F 21/602; G06F 21/645; G06N 20/00; G06N 20/02; G06N 20/06; G06N 20/3827; G06N 20/405; G06N 3/08; H04W 4/70; G06Q 2220/00; G06Q 20/405; G06Q 20/389; G06Q 20/3827; G06Q 20/06; G06Q 20/02
See application file for complete search history.

(56) References Cited

U.S. PATENT DOCUMENTS

| | | | |
|---|---|---|---|
| 8,364,955 | B1 | 1/2013 | Sharma et al. |
| 9,135,588 | B2 | 9/2015 | Nivala et al. |
| 9,647,896 | B1 | 5/2017 | Mulder et al. |
| 10,084,762 | B2 | 9/2018 | Versteeg et al. |
| 10,581,847 | B1 | 3/2020 | Sun et al. |
| 2005/0071275 | A1 | 3/2005 | Vainstein et al. |
| 2006/0248083 | A1 | 11/2006 | Sack et al. |
| 2009/0083768 | A1 | 3/2009 | Hatalkar et al. |
| 2012/0237022 | A1 | 9/2012 | Berson et al. |
| 2015/0067154 | A1 | 3/2015 | Ly et al. |
| 2016/0275526 | A1 | 9/2016 | Becanovic |
| 2016/0292672 | A1 | 10/2016 | Fay et al. |
| 2016/0300234 | A1 | 10/2016 | Moss-pultz et al. |
| 2017/0005804 | A1* | 1/2017 | Zinder ............ G06F 16/219 |
| 2017/0041296 | A1 | 2/2017 | Ford et al. |
| 2017/0046651 | A1 | 2/2017 | Lin et al. |
| 2017/0124556 | A1 | 5/2017 | Seger, II |
| 2017/0126702 | A1 | 5/2017 | Krishnamurthy |
| 2017/0236094 | A1 | 8/2017 | Shah |
| 2017/0352027 | A1 | 12/2017 | Zhang et al. |
| 2017/0353309 | A1 | 12/2017 | Gray |
| 2018/0005186 | A1 | 1/2018 | Hunn |
| 2018/0025181 | A1 | 1/2018 | Barinov et al. |
| 2018/0137465 | A1* | 5/2018 | Batra ............ G06Q 10/103 |
| 2018/0191502 | A1 | 7/2018 | Karame |
| 2018/0191503 | A1* | 7/2018 | Alwar ............ H04L 9/14 |
| 2018/0205555 | A1 | 7/2018 | Watanabe et al. |
| 2018/0218003 | A1* | 8/2018 | Banga ............ G06F 16/162 |
| 2018/0225448 | A1 | 8/2018 | Russinovich et al. |
| 2018/0225640 | A1 | 8/2018 | Chapman et al. |
| 2018/0227116 | A1 | 8/2018 | Chapman et al. |
| 2018/0260888 | A1 | 9/2018 | Paolini-subramanya et al. |
| 2018/0285971 | A1* | 10/2018 | Rosenoer ............ G06Q 40/025 |
| 2018/0308072 | A1* | 10/2018 | Smith ............ G06Q 20/02 |
| 2018/0313798 | A1 | 11/2018 | Chokshi et al. |
| 2018/0314809 | A1* | 11/2018 | Mintz ............ G06F 21/105 |
| 2018/0315141 | A1 | 11/2018 | Hunn et al. |
| 2018/0315145 | A1* | 11/2018 | Darnell ............ G06Q 50/205 |
| 2018/0322587 | A1* | 11/2018 | Linne ............ H04L 9/3236 |
| 2018/0330125 | A1 | 11/2018 | Gray |
| 2019/0013932 | A1 | 1/2019 | Maino et al. |
| 2019/0013933 | A1 | 1/2019 | Mercuri et al. |
| 2019/0013934 | A1 | 1/2019 | Mercuri et al. |
| 2019/0013948 | A1 | 1/2019 | Mercuri et al. |
| 2019/0058592 | A1* | 2/2019 | Wright ............ H04L 9/0825 |
| 2019/0349733 | A1 | 11/2019 | Nolan et al. |
| 2020/0311818 | A1 | 10/2020 | Miller et al. |
| 2020/0322129 | A1 | 10/2020 | Wei et al. |

OTHER PUBLICATIONS

"Non-Final Office Action Issued in U.S. Appl. No. 15/987,448", dated Mar. 16, 2020, 13 Pages.

"Convergent Encryption", Retrieved From: https://en.wikipedia.org/w/index.php?title=Convergent_encryption&oldid=659260002, Apr. 26, 2015, 2 Pages.

"Getting Smart: Contracts on the Blockchain", Retrieved From: https://www.iif.com/system/files/32370132_smartcontracts_report_may_2016_vf.pdf, May 2016, pp. 1-11.

Adams, Tori, "Blockchain, Smart Contracts, and Health: Booz Allen Hamilton and The Blockchain Revolution", Retrieved From: https://www.linkedin.com/pulse/blockchain-smart-contracts-health-booz-allen-hamilton-tori-adams, Dec. 11, 2015, 7 Pages.

Eufemio, et al., "Digix's Whitepaper: The Gold Standard in Crypto-Assets", Retrieved From: https://digix.global/whitepaper.pdf, Jan. 2016, 22 Pages.

Gantait, et al., "Implementing Blockchain for Cognitive IoT Applications, Part 2: Use Vehicle Sensor Data to Execute Smart Transactions in Blockchain", Retrieved From: https://www.ibm.com/developerworks/cloud/library/cl-blockchain-for-cognitive-iot-apps2/index.html, Jun. 5, 2017, pp. 1-17.

Hull, et al., "Towards a Shared Ledger Business Collaboration Language Based on Data-Aware Processes", In Proceedings of the International Conference on Service-Oriented Computing, Oct. 10, 2016, pp. 18-36.

Panikkar, et al., "ADEPT: An IoT Practitioner Perspective", Retrieved From: https://archive.org/stream/pdfy-esMcC00dKmdo53-_/IBM%20ADEPT%20Practictioner%20Perspective%20-%20Pre%20Publication%20Draft%20-%207%20Jan%202015_djvu.txt, Jan. 7, 2015, pp. 1-18.

"International Search Report and Written Opinion Issued in PCT Application No. PCT/US2018/040077", dated Oct. 10, 2018, 16 Pages.

"International Search Report and Written Opinion Issued in PCT Application No. PCT/US2018/040087", dated Oct. 10, 2018, 14 Pages.

"International Search Report and Written Opinion Issued in PCT Application No. PCT/US2018/040096", dated Oct. 10, 2018, 16 Pages.

"International Search Report and Written Opinion Issued in PCT Application No. PCT/US2018/040103", dated Oct. 11, 2018, 14 Pages.

"International Search Report and Written Opinion Issued in PCT Application No. PCT/US2018/040108", dated Oct. 10, 2018, 16 Pages.

(56) References Cited

OTHER PUBLICATIONS

Weber, et al., "Untrusted Business Process Monitoring and Execution Using Blockchain", In Proceeding of the International Conference on Business Process Management, Sep. 18, 2016, pp. 329-347.
"Final Office Action Issued in U.S. Appl. No. 15/995,078", dated Sep. 25, 2020, 18 Pages.
"Final Office Action Issued in U.S. Appl. No. 15/987,448", dated Jul. 8, 2020, 13 Pages.
"Non Final Office Action Issued in U.S. Appl. No. 15/995,070", dated Jul. 15, 2020, 29 Pages.
"Notice of Allowance Issued in U.S. Appl. No. 15/957,458", dated Sep. 3, 2020, 9 Pages.
"Non Final Office Action Issued in U.S. Appl. No. 15/995,078", dated May 14, 2020, 17 Pages.
"Final Office Action Issued in U.S. Appl. No. 15/995,070", dated Dec. 14, 2020, 40 Pages.
"Notice of Allowance Issued in U.S. Appl. No. 15/995,078", dated Mar. 31, 2021, 13 Pages.
"Notice of Allowance Issued in U.S. Appl. No. 15/995,070", dated May 28, 2021, 12 Pages.

\* cited by examiner

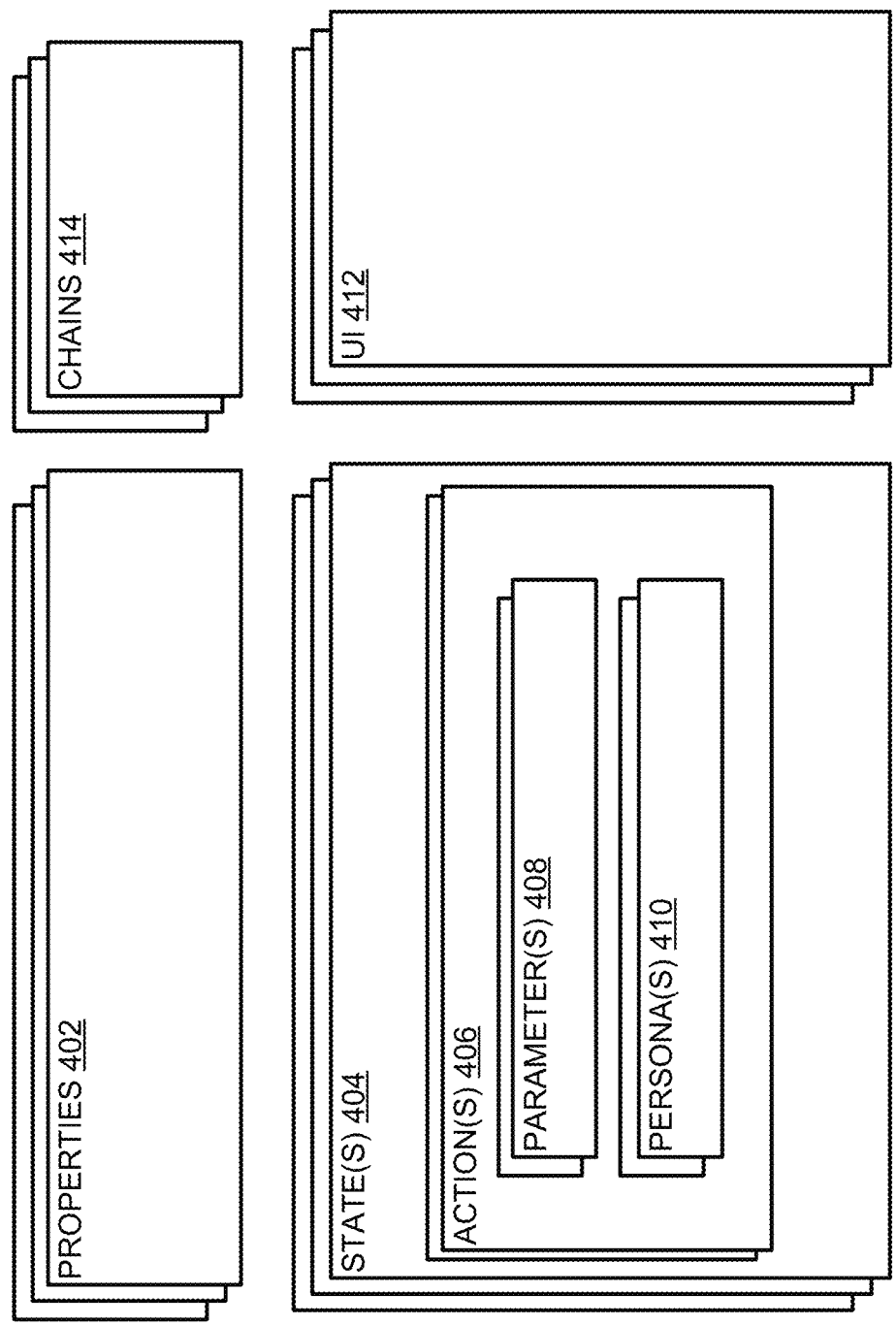

BLOCKCHAIN CLIENT — ADAM SMITH    LOGOUT

NOTIFICATIONS 902

[ RESCIND OFFER ]  [ VIEW ]

Contract has been Modified

YOUR ASSET TRANSFERS 904

[ CREATE NEW CONTRACT ]

| STATE | OWNER | DESCRIPTION | ASK | BUYER | OFFER | INSPECTOR | APPRAISER |
|---|---|---|---|---|---|---|---|
| ACTIVE | ADAM SMITH | FORD MODEL T | $3,000,000 | JOHN GALT | $33,000 | JIM CHANOS | THOMAS JEFFERSON |
| ACTIVE | ADAM SMITH | TESLA MODEL S | $60,000 | | | | |
| OFFER PLACED | THOMAS FRIEDMAN | TESLA MODEL C | $55,000 | ADAM SMITH | $33,000 | JIM CHANOS | THOMAS JEFFERSON |
| INACTIVE | PRESTON TUCKER | TUCKER | $8,005,000 | JOHN GALT | $8,000,000 | JIM CHANOS | THOMAS JEFFERSON |
| ACTIVE | FERDINAND PORSCHE | PORSCHE 911 | $1,000,000 | | | | |
| ACTIVE | FREDRICK MAYTAG | MAYTAG | $799,000 | | | | |
| ACTIVE | CHARLES ROLLS | ROLLS ROYCE | $5,000 | | | | |
| ACTIVE | KARL BENZ | MERCEDES C300DS | $5,000,000 | JOHN GALT | $5,000,000 | JIM CHANOS | THOMAS JEFFERSON |
| ACTIVE | ENZO FERRARI | FERRARI | $95,000 | | | | |
| ACTIVE | JOHN DODGE | DODGE | $99,000,000 | TATSUO YOSHIDA | $99,000,000 | GADGET | LODE RUNNER |
| ACTIVE | THOMAS FRIEDMAN | SPEED RACER | | | | | |

FIGURE 9B

BLOCKCHAIN ANALYTICS

PRIORITY

This application claims the benefit of U.S. Provisional Application No. 62/530,081 having the title "SMARTLET MANAGER", filed on Jul. 7, 2017, the disclosure of which is hereby incorporated by reference in its entirety.

TECHNICAL FIELD

The technology described herein relates to a computer system that interfaces with a blockchain to store data and interact with blocks on the blockchain.

BACKGROUND

Blockchain systems have been proposed for a variety of application scenarios, including applications in the financial industry, healthcare, emerging markets, and so forth. An early example of a blockchain was a cryptocurrency. The crypto currency was generated when new blocks were created on the blockchain to confirm tranactions of the cryptocurrency. The new blocks may confirm the transfer of cryptocurrency generated in earlier blocks. The blocks on the blockchain were cryptographically proofed and linked to earlier blocks and served as an immutable record of the events in a trustless decentralized peer-to-peer network. For example, a cryptocurrency (e.g., bitcoin) is represented as a chain of events that transfers ownership from one party to another party on a blockchain without an intermediary. Each event transferring ownership from one party to another is cryptographically proofed by including the public key of the new owner. Also, each event is digitally signed with the current owner's private key.

A new block in a blockchain is filled with cryptographically proofed events until the block reaches a specified size limit. A hash digest of all the event identifiers within the block and the block header of the previous block are added as the first event in the block. Each block of events may be secured by a race between participants on a peer-to-peer network. In order to win the race the participants collect new events to create the new block, validate the events on the new block by verifying the cryptographic proofs of each event to verify the cryptocurrency was not spent earlier, and finally solve a mathematical puzzle based on the hash digest, previous block header and a random number. Blockchain provides a mathematical hierarchy of verifiable events that is immutable and is verified at each stage by the race between the participants. Other consensus protocols may be used to secure the blocks instead of the cryptographic race. Examples of consensus protocols include proof of work, proof of useful work, proof of stake, gossip about gossip and the like.

After blockchain was applied for cryptocurrency, the principles used in the early blockchain were modified to allow execution of smart contracts deployed on the blockchain. Smart Contracts are self-executing machine-readable instructions that can store state information and are stored on the blockchain. When deployed, the smart contract is assigned a unique address to allow communication to and from the smart contract through messages. The smart contract is deployed by storing the smart contract as an event on the blockchain (e.g., Ethereum™ blockchain). Messages to the smart contract may be posted as events on the blockchain. The smart contract may contain machine-readable instructions and data designed to execute on virtual machines. The smart contract may have the ability to read or write to its internal storage storing data, read the storage of a received message, send messages to other smart contracts to trigger execution of the code in other distributed applications. When the smart contract is executed on a virtual machine running on the peers securing the blockchain, the resulting data may be saved in the internal storage of the smart contract. The updated smart contract may be stored as an event on a new block. Thus, the smart contract and changes to data, i.e., state of the smart contract, are represented as a series of events on the blockchain. Similar to the cryptocurrency blockchain, each block in the blockchain by mining the blockchain by peers based on a consensus protocol.

For example, in a smart contract that governs a sale of an electronic asset, the smart contract may include machine-readable instructions to access its internal storage, machine-readable instructions to read the storage of a message sent to the smart contract and machine-readable instructions to process the data in a received message such as a counter-offer from a buyer. When the buyer sends a counter-offer to the smart contract, the smart contract may update its internal storage to include the counter-offer event, such as the identity of the buyer, the counter-offer price etc. The updated smart contract may be recorded as an event (e.g., a transaction) on a new block on the blockchain. In other words, the blockchain stores the changes in state of the smart contract as a series of events (e.g. a transaction). In an example, the blockchain may use a consensus algorithm that incentives peers to execute the smart contract in a virtual machine and record the changes to the internal storage in the smart contract, i.e., state of the smart contract to create new blocks.

The smart contract (e.g., a smart contract) may allow the administration and enforcement of some or all of the obligations and liabilities of the participants that may interact with the smart contract. One smart contract may use a second smart contract, called a utility smart contract, to provide a library of functions to other smart contracts. In an example, a utility smart contract may obtain updates on conditions that may affect the obligations and liabilities of the parties to the smart contract such as loan rates. However, smart contracts in a blockchain such as Ethereum™ ran on all peers involved in securing the events on the blockchain, increasing the cost of producing an immutable record of an event on the blockchain. Also, the smart contract in the blockchain may include code and data accessible to everyone by retrieving the blockchain.

Many blockchain implementations have emerged. There are currently over eighty different kinds of blockchains. Support for smart contracts varies in the different blockchains. Even among the blockchain implementations that support smart contracts, the available features vary.

Using smart contracts and the blockchain poses technical challenges for even the sawiest participants. For example, the current block in the blockchain contains events that were received by a peer within a certain period. Therefore, the blocks may contain random events, without any other relationship to each other. Similarly, the events (e.g., a transaction) may relate to smart contracts or other smart contracts that are present in previous blocks in the blockchain. For example, the smart contracts may be identified by an identifying address or number, stored in a block of the blockchain. The smart contract may be packed into blocks optimized to meet block size limitations for retrieval. The smart contract stored on the block may be difficult to locate because of the lack of organization of the events recorded in each block. Also, different smart contract versions may be stored in multiple blocks, often on incompatible blockchain implementations (e.g., hard-forks). Similarly, events on the blockchain may be secured with cryptographic keys to interact with the smart contract.

Furthermore, blockchain enterprise applications are difficult to implement because they require knowledge of cryptography, knowledge of peer-to-peer systems, and knowledge of specialized languages used in blockchain smart contracts, which prevents people with enterprise expertise from building applications on the blockchain. Other technical issues associated with blockchains include interfacing an application on the blockchain to already existing technologies, such as reporting services, analytics, databases, data storage, artificial intelligence and the like.

BRIEF DESCRIPTION OF THE DRAWINGS

Features of the present disclosure are illustrated by way of example and not limited in the following Figure(s), in which like numerals indicate like elements, in which:

FIG. 5 shows a context schema, according to an embodiment of the present disclosure;

FIGS. 7, 8, 9A and 9B show examples of a user interface for interacting with a blockchain object, according to embodiments of the present disclosure.

DETAILED DESCRIPTION

Figure 1:
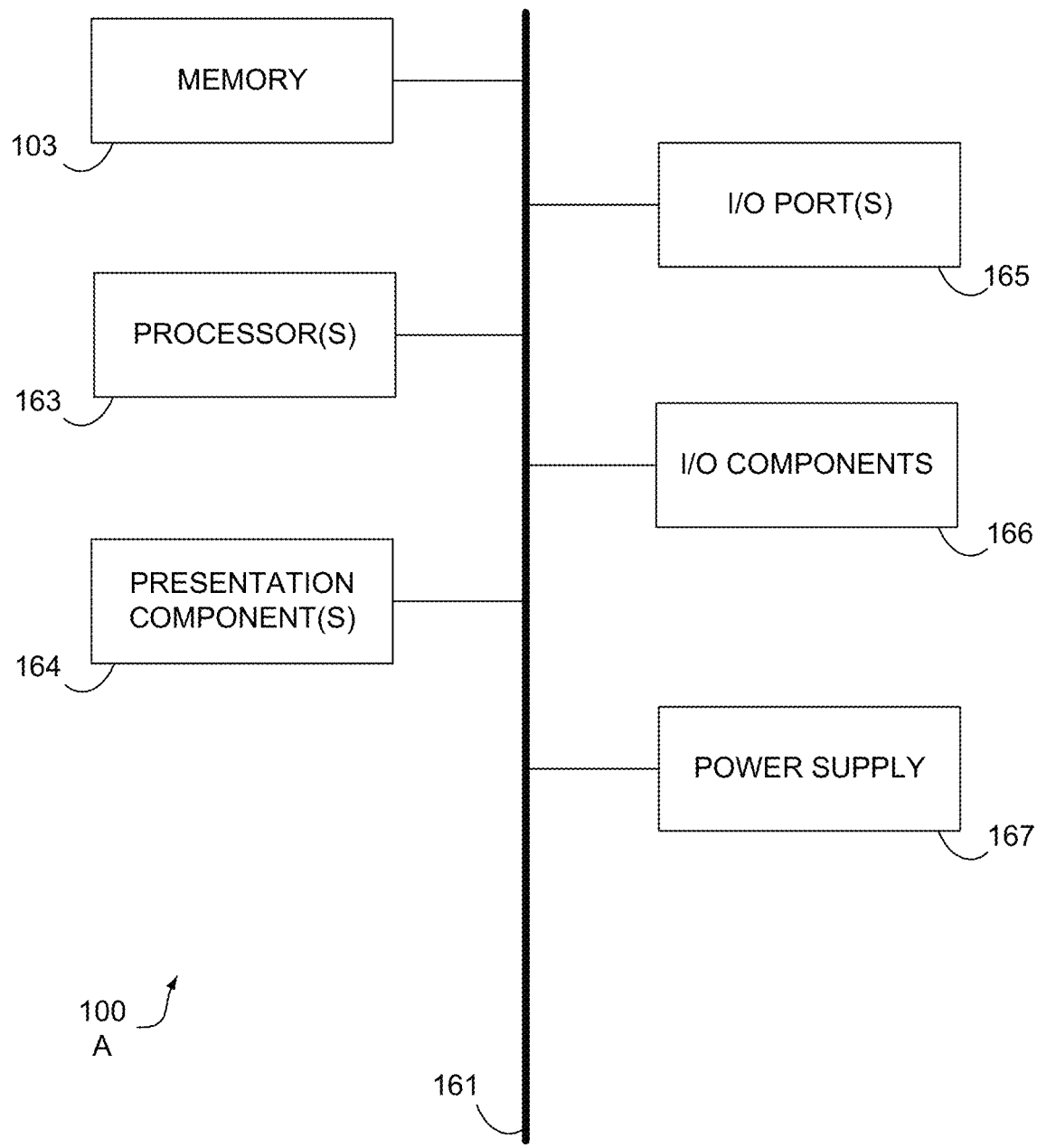
FIG. 1 illustrates an example of a computing environment for a blockchain analytics system, according to an embodiment of the present disclosure.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an embodiment of the present disclosure, a blockchain analytics system facilitates determination of parameters of blockchain objects for analytics. The system may store determined parameters in a data repository. The system may use the determined parameters to generate a machine learning blockchain analytics model. The machine learning blockchain analytics model may be used to generate visualizations of parameters, for pattern detection and/or for detecting anomalies. For example, performance of a manager selling cars using smart contracts.

In another example, the blockchain analytics system may facilitate creation of a profile for a parameter of a blockchain object. Examples of parameters of the blockchain object may include an identity of a participant, a role of a participant, a type of the blockchain object and the like. The system 100 may then generate an integrated profile that combines the off-chain information with the blockchain information. For example, the system 100 may use a data broker that provides a repository of the event information from the internet. A data broker may provide information about a participant based on the participant's browsing profile. The system 100 may then generate an integrated profile that combines the off-chain and blockchain events. The system 100 may allow targeted advertising based on the generated profile. Also, the system may allow blockchain agnostic services such as the analytics services and/or the reporting/integration service to interface with the blockchain.

A blockchain object may be a smart contract deployed on a blockchain. In an example, the smart contract may be called a smartlet. In another example, the blockchain object may be a cryptlet that may be executed in a secure enclave instead of on all peers on the peer-to-peer network mining the blockchain to arrive at a consensus on the next block of the blockchain. In an example, a cryptlet is an off-chain machine-readable instruction, that executes within a secure, trusted container and communicated with using secure channels to provide additional functionality or information to one or more blockchain objects. The context schema may describe the constraints on interactions of a blockchain object. The blockchain object may be of two types, one with code capable of being executed on a node of a peer-to-peer network mining the blockchain, and one without code.

Examples of constraints may include state, persona, role, action, and parameters of an action associated with the blockchain object and the like. In an example, a blockchain object may be a smartlet that regulates an interaction between two or more participants for a specified objective. A participant may be a participant of the blockchain with a specific objective with respect to a blockchain object on the blockchain. An example of a specific objective may be monitoring of the delivery of goods using Internet of Things (IoT) sensors, compliance with specifications of the goods and the like. The blockchain object may regulate an interaction with and to the blockchain object based on constraints defined in machine-readable instructions. The blockchain object may save an immutable record of the interaction on a new block on the blockchain.

The blockchain object may contain machine-readable instructions that govern the interactions of the blockchain object. The blockchain object may save its current state on the blockchain. For example, the blockchain object may store its state in the blockchain object itself. In another example, the blockchain object may store its state in the blockchain outside the blockchain object. The interactions of the blockchain object may be restricted by the machine-readable instructions to serve a specific purpose. For example, the blockchain object may interact with its stored state or interact with other blockchain objects. The blockchain object may be deployed on the blockchain. The blockchain object deployed on the blockchain may be assigned a unique address.

The blockchain may receive events associated with the blockchain object from an event stack of the system in the form of messages addressed to the blockchain object's unique address. In an example, the system may deploy a message with an event associated with a first blockchain object on the blockchain by including a second blockchain object addressed to the prior blockchain object in a new block of the blockchain. The second blockchain object may be a data object. A peer in a peer-to-peer network mining the blockchain to build a consensus may receive the second object and include the second blockchain object in the new block of the blockchain. In an example, the peer may execute machine-readable instructions on the first blockchain object in response to the second blockchain object addressed to the first blockchain object. The first blockchain object may store its change after execution, i.e., change its state or remain in the same state. The node may store the first blockchain object (which may have a changed state) along with the second blockchain object in a new block before mining the new block to arrive at a consensus. In an example, to prevent the blockchain object from being executed on all peers mining the blockchain, the blockchain object may be a cryptlet executed on the system in a secure enclave. The system may retrieve both the first blockchain object and the message (e.g., the second blockchain object) and execute the machine-readable instructions in a secure enclave and deploy the resulting blockchain object back to the blockchain.

The blockchain object may include machine-readable instructions that perform actions that are constrained. The machine-readable instructions may record the current state of the blockchain object, the person who deployed the blockchain object, the persons who may interact with the blockchain object and the like. In an example, the system may use the blockchain object machine-readable instructions and/or the current state stored in the blockchain to derive the context of the blockchain object.

The event stack of the system provides an interface between events and the blockchain object. For example, the event stack may deliver an event to the blockchain object using one or more services. Events may include external events to the system and internal events generated in the system. For example, an internal service may generate periodic events. An example of an external event may be a message from an IoT device received by the system. The event stack may queue events for processing by one or more system services. Examples of external events may include a weather report, a social media message, a message from an IoT device (e.g., measurements from IoT sensors), etc. In an example, a blockchain object may monitor the state of perishable goods that are on route from a factory to a retail location. The event stack may receive events, such as measurements changes from IoT sensors monitoring the temperature of the perishable goods, and then trigger a change in the state of the blockchain object. Examples of internal events may include an event generated by an internal service in the system. For example, a cryptlet in the system may generate an internal event periodically. In an example, the event may alter the state of the blockchain object. Also, the system may provide an interface for monitoring and managing the state of a blockchain object by monitoring the blockchain updates on the blockchain.

The event stack may allow the system to process events in real-time. The event stack may queue events as the events arrive. The system may treat inputs received from outside the system as events and use the event stack to allow one or more services to process the events. In an example, the system may also treat inputs and outputs of services as events that may be processed by other services. The system may include one or more services that retrieve and process the events. Thus, the system (e.g., services of the system) may access the queued events to retrieve and process the events. For example, the system may allow integration of an enterprise banking system that can perform operations such as money transfers and loan approval processing with a blockchain object without any changes to the enterprise banking system.

The system may utilize a context schema to provide context to the logic expressed in the blockchain object (e.g., smart contract) for example to generate an Application Programming Interface. The Application Programming Interface may allow interaction with the blockchain object through a webpage, mobile page or a bot and the like. In an example, the system may generate a user interface that allows a participant to interact with a blockchain object based on a context schema. The context schema may describe the specifications of the blockchain object and constraints for interacting with the blockchain object. For example, a context schema may describe the current status of the blockchain object, the possible state transitions from the current state, the personas who may interact with the blockchain object, and the like. In an example, an instance of the context schema may be saved as a configuration file. The configuration file may be specific to a blockchain object. The configuration file may be stored in the system and/or on the blockchain object.

The user interface generated by the system allows a participant, such as a user or a system, to interact with the blockchain object. For example, the system may generate different graphical user interfaces (GUIs) based on the current state of the blockchain object, the previous states of the blockchain object, future states, possible actions in the current state, possible actions based on the persona of the participant in the interaction, parameters of actions, and the like. The event stack receives events, such as participant interaction from the graphical user interface for processing by the services of the system. In an example, the system may store context schema values in a data repository (e.g., a database) in off-chain storage to store the contextual information. For example, the system may use the context schema to determine a persona type that is authorized to act on the blockchain object in its current state. For example, the persona type may be a user authorized to sell cars in a car dealership. In an example, the context schema may describe a hierarchy of blockchain object, state, action, persona, role, and other contextual data along with the history of the event. In an example, the user interface may be a web browser application to receive interaction from participants of the blockchain. The system may receive the interactions of the participants with the web browser application at the event stack in the form of events.

For example, the system may receive events (from the participants) via the user interface. Examples of events received from the user interface may include a user interaction with a blockchain object in accordance with its context schema, a request to retrieve state information of a blockchain object and parameters of the blockchain object, and instructions or parameters for deploying a blockchain object. For example, to deploy a blockchain object, the system may receive a blockchain identifier indicating where a blockchain object must be deployed from the user interface or may retrieve the blockchain identifier from off-chain storage as an internal event. In an example, a cryptlet may retrieve this information from the off-chain storage. The system may process the received events to determine the interaction between a participant and a blockchain object. In an example, the system may receive a parameter for the blockchain object based on a parameter specification in a context schema. The system may initialize the blockchain object with the received parameter. The system may deploy the initialized blockchain object to the blockchain. The system may also monitor a blockchain object on the blockchain, and store and provide information regarding updates to the blockchain object.

The system according to an example may allow authentication of participants using a simplified login with a username and password. The system may match the off-chain identity of the participant with the blockchain identity of the participant. For example, the blockchain identity of a participant may be a public key, private key pair stored in a key vault. The system may provide services such as a signing service that transparently integrates the off-chain identity of the participant with the blockchain identity of the participant. For example, the system may allow a participant to deploy the blockchain object to the blockchain by automating the signing procedure for blockchain objects before deploying the blockchain object using the appropriate private key pair and public key pair. For example, an organization may authorize only managers to authorize the sale of an asset such as a car. The system may abstract the deployment process for a blockchain object before deployment. For example, the system may present the manager with the details of the blockchain object such as the asset description, price of the asset, owner of the asset and the like in addition to an action list of actions for the manager, such as to approve deployment or disapprove deployment. The system may link the off-chain identity of the participant and retrieve the appropriate keys, initialize the blockchain object with the appropriate parameters, request for missing parameters, sign the blockchain object with the appropriate cryptographic signature and deploy the blockchain object.

Referring to the drawings in general, and initially to FIG. 1 in particular, an operating environment for the blockchain analytics system 100 (also referred to as the system 100). The operating environment for the system 100 is illustrated generally as computing device 101. Computing device 101 is but one example of a suitable operating environment and is not intended to suggest any limitation as to the scope of use or functionality of the disclosure. Neither should computing device 101 be interpreted as having any dependency or requirement relating to any one or combination of components illustrated. FIG. 3 below describes one example of the computing device 101. FIG. 3 includes components designed using the cloud architecture described in FIG. 2.

Components of the system 100 may be described and implemented in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Examples of the disclosure may be practiced in a variety of system configurations, including handheld devices, consumer electronics, general-purpose computers, specialty computing devices, etc. Aspects of the disclosure may also be practiced in distributed computing environments where tasks are performed by remote-processing devices that are linked through a communications network.

With continued reference to FIG. 1, computing device 101 includes a bus 161 that directly or indirectly couples the following devices: memory 103, one or more processors 163, one or more presentation components 164, input/output (I/O) ports 165, I/O components 166, and an illustrative power supply 167. Bus 161 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Recognizing that such is the nature of the art, the diagram of FIG. 1 is merely illustrative of an example of a computing device that can be used in connection with one or more examples of the present disclosure. Distinction is not made between such categories as "workstation," "server," "laptop," "handheld device," etc., as all are contemplated within the scope of FIG. 1 and reference to "computer" or "computing device."

Computing device 101 typically includes a variety of non-transitory computer readable media. By way of example, and not limitation, computer readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 101. Computer storage media does not, however, include propagated signals. Rather, computer storage media excludes propagated signals. Any such computer storage media may be part of computing device 101.

Memory 103 includes computer storage media in the form of volatile and/or nonvolatile memory. The memory may be removable, non-removable, or a combination thereof. Examples of hardware devices include solid-state memory, hard drives, optical-disc drives, etc. Processors 163 read data from various entities such as memory 103 or I/O components 166. Memory 103 stores, among other data, one or more applications. The applications, when executed by the one or more processors, operate to perform functionality on the computing device. The applications may communicate with counterpart applications or services such as web services accessible via a network (not shown). For example, the applications may represent downloaded client-side applications that correspond to server-side services executing in a cloud. In some examples, aspects of the disclosure may distribute an application across a computing system, with server-side services executing in a cloud based on input and/or interaction received at client-side instances of the application. In other examples, application instances may be configured to communicate with data sources and other computing resources in a cloud during runtime, such as communicating with a cluster manager or health manager during a monitored upgrade or may share and/or aggregate data between client-side services and cloud services.

Presentation component(s) 164 present data indications to a participant or other device. Examples of presentation components include a display device, speaker, printing component, vibrating component, etc. I/O ports 165 allow computing device 101 to be logically coupled to other devices including I/O components 166, some of which may be buser interfaceIt in. Illustrative components include a microphone, joystick, game pad, satellite dish, scanner, printer, wireless device, etc.

Figure 2:
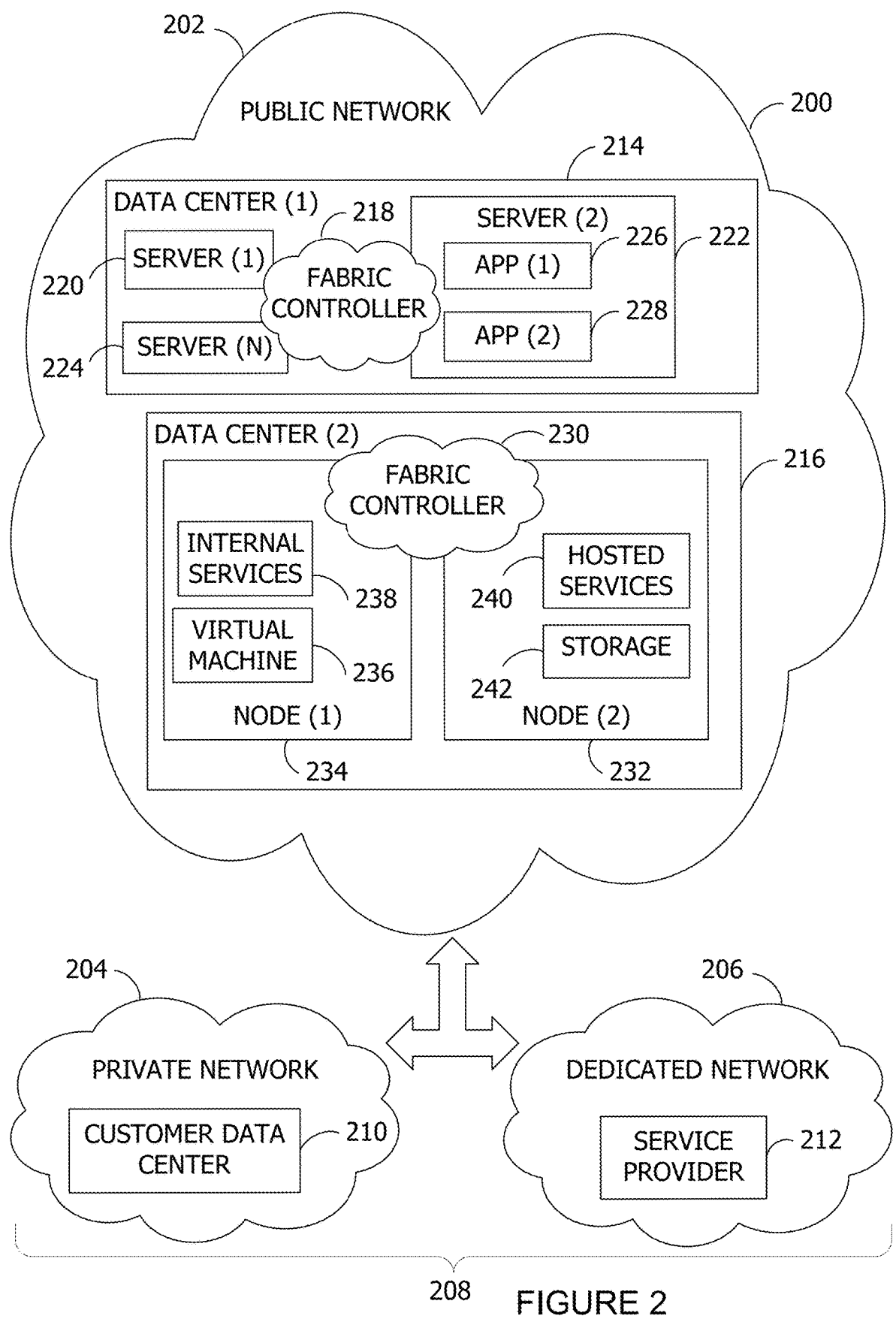
FIG. 2 shows an example of cloud system components that may be used to build a blockchain analytics system for blockchain objects, according to an embodiment of the present disclosure.
Figure 3:
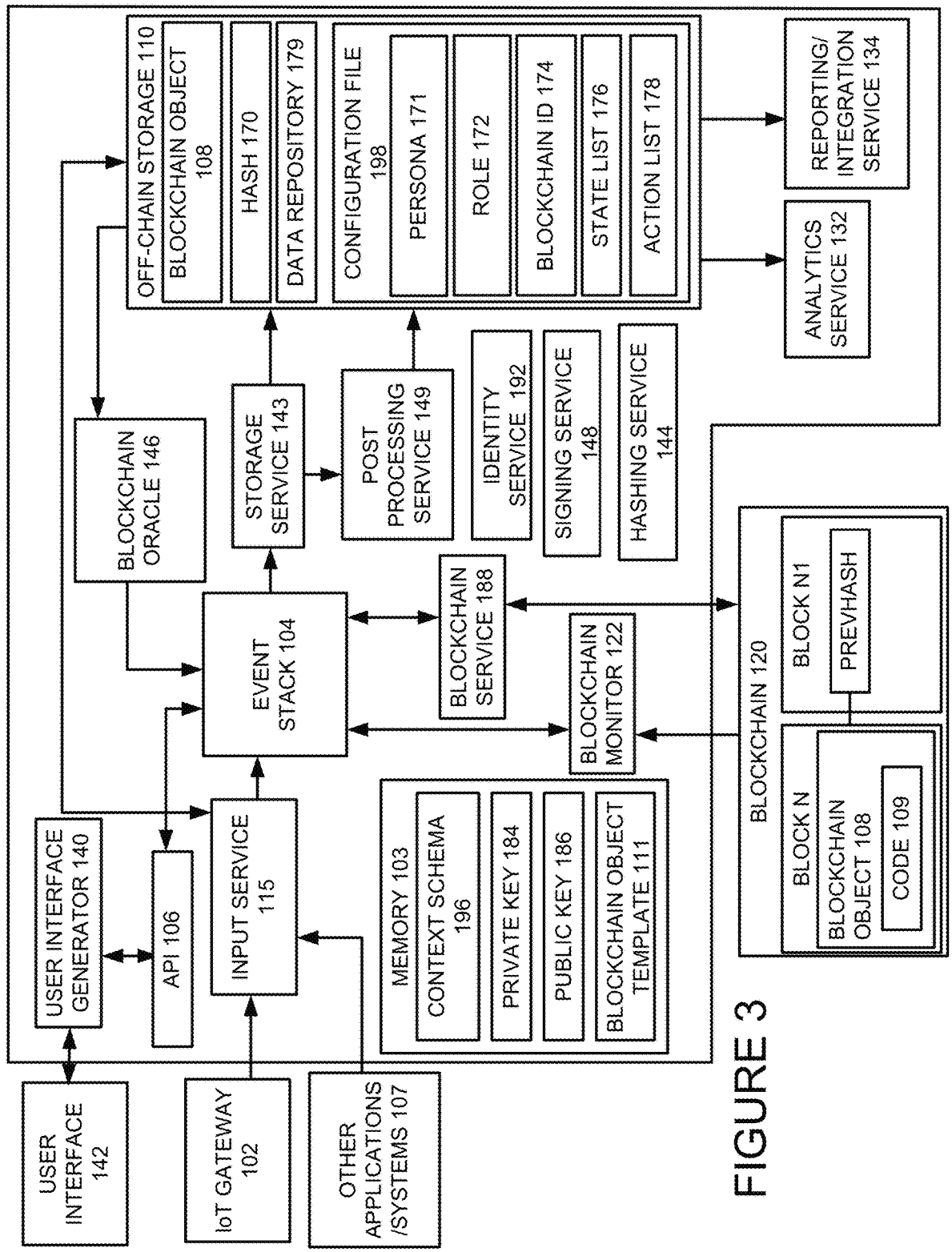
FIG. 3 illustrates a system diagram of a blockchain analytics system for creating, deploying and managing a blockchain object, according to an embodiment of the present disclosure.

FIG. 2 shows an example of an architecture 200 of a cloud computing environment for one or more components of the system 100 (described in detail in FIG. 3). The one or more components of the system 100 may use one or more components shown in FIG. 2 to create one or more services described in further detail in FIG. 3. The one or more services of the system 100 may generate a blockchain object, deploy a blockchain object, interface with a blockchain object, manage a blockchain object and/or provide a blockchain analytics service. Architecture 200 should not be interpreted as having any dependency or requirement related to any single component or combination of components illustrated therein. Also, any number of nodes, virtual machines, data centers, role instances, or combinations thereof may be employed to achieve the desired functionality within the scope of embodiments of the present disclosure.

The distributed computing environment of FIG. 2 includes a public network 202, a private network 204, and a dedicated network 206. Public network 202 may be a public cloud, for example. Private network 204 may be a private enterprise network or private cloud, while dedicated network 206 may be a third party network or dedicated cloud. In this example, private network 204 may host a customer data center 210, and dedicated network 206 may host an internet service provider 212. Hybrid cloud 208 may include any combination of public network 202, private network 204, and dedicated network 206. For example, dedicated network 206 may be optional, with hybrid cloud 208 comprised of public network 202 and private network 204.

Public network 202 may include data centers configured to host and support operations, including tasks of a generating, deploying, interfacing, and managing the blockchain object, according to embodiments of the current disclosure. It may be understood and appreciated that data center 214 and data center 216 shown in FIG. 2 an example of one implementation for accommodating one or more applications and is not intended to suggest any limitation as to the scope of use or functionality of embodiments of the present disclosure. Neither should data center 214 and data center 216 be interpreted as having any dependency or request interfacerement related to any single resource, combination of resources, combination of servers (e.g., server 220, server 222, and server 224) combination of nodes (e.g., nodes 232 and 234), or set of APIs to access the resources, servers, and/or nodes.

Data center 214 illustrates a data center comprising a plurality of servers, such as server 220, server 222, and server 224. A fabric controller 218 is responsible for automatically managing the servers and distributing tasks and other resources within the data center 214. By way of example, the fabric controller 218 may rely on a service model (e.g., designed by a customer that owns the modular-application) to provide guser interface dance on how, where, and when to configure server 222 and how, where, and when to place application 226 and application 228 thereon. In one embodiment, one or more role instances of a modular-application may be placed on one or more of the servers of data center 214, where the one or more role instances may represent the portions of software, component programs, or instances of roles that participate in the blockchain object application manager application. In another embodiment, one or more of the role instances may represent stored data that is accessible to the blockchain object application manager.

Data center 216 illustrates a data center comprising a plurality of nodes, such as node 232 and node 234. One or more virtual machines may run on nodes of data center 216, such as virtual machine 236 of node 234 for example. Although FIG. 2 depicts a single virtual node on a single node of data center 216, any number of virtual nodes may be implemented on any number of nodes of the data center in accordance with illustrative embodiments of the disclosure. Generally, virtual machine 236 is allocated to role instances of a modular-application, or service application, based on demands (e.g., amount of processing load) placed on the modular-application. As used herein, the phrase "virtual machine" is not meant to be limiting, and may refer to any software, application, operating system, or program that is executed by a processing unit to underlie the functionality of the role instances allocated thereto. Further, the virtual machine 236 may include processing capacity, storage locations, and other assets within the data center 216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 230 is responsible for automatically managing the virtual machines running on the nodes of the data center 216 and for placing the role instances and other resources (e.g., software components) within the data center 216. By way of example, the fabric controller 230 may rely on a service model (e.g., designed by a customer that owns the service application) to provide user interface on how, where, and when to configure the virtual machines, such as virtual machine 236, and how, where, and when to place the role instances thereon.

As discussed above, the virtual machines may be dynamically established and configured within one or more nodes of a data center. As illustrated herein, node 232 and node 234 may be any form of computing devices, such as, for example, a personal computer, a desktop computer, a laptop computer, a mobile device, a consumer electronic device, server(s), and the like. In one instance, the nodes host and support the operations of the virtual machines, while simultaneously hosting other virtual machines carved out for supporting other tenants of the data center 216, such as internal services 238 and hosted services 240. Often, the role instances may include endpoints of distinct service applications owned by different customers.

Typically, each of the nodes includes, or is linked to, some form of a computing unit (e.g., a central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer readable medium (e.g., computer storage media and communication media) accommodated by each of the nodes.

The role instances that reside on the nodes support the operation of service applications and may be interconnected via application programming interfaces (APIs). In one instance, one or more of these interconnections may be established via a network cloud, such as public network 202. The network cloud serves to interconnect resources, such as the role instances, which may be distributable placed across various physical hosts, such as nodes 232 and 234. Also, the network cloud facilitates communication over channels connecting the role instances of the service applications running in the data center 216. By way of example, the network cloud may include, without limitation, one or more local area networks (LANs) and/or wide area networks (WANs). Such networking environments are commonplace in offices, enterprise-wide computer networks, intranets, and the internet. Accordingly, the network is not further described herein.

With reference to FIG. 3, there is shown the system 100 that may create, deploy and manage a blockchain object, according to an embodiment. For example, FIG. 3 shows a blockchain object 108 that may be created by the system 100 and may be deployed on a blockchain 120 by the system 100. In an example, the blockchain object 108 may be a smartlet. As is further discussed below, the system 100 may also serve as an interface between an event, which may be received and queued for processing in an event stack 104, and the blockchain object 108. The system 100 may also facilitate and control interactions with the blockchain object 108 by a participant or another system attempting to interact with the blockchain object 108. Also, the system 100 allows services, which may be incorporated in the system 100, to process events and other information pertaining to the blockchain object 108. A service may refer to a software functionality or a set of software functionalities that different systems or users or other software functionalities can reuse and may include policies that control its usage. It should be understood that the system 100 may include additional components other than shown and that one or more of the components described herein may be removed and/or modified without departing from a scope of the system 100.

The event stack 104 queues one or more events. For example, the event stack 104 may be a service on a cloud platform using some or all of the components described in FIG. 2 to receive data from multiple sources and queue the data for other services in the system 100 to further process. In an example, the event stack 104 may receive large streams of data and include a scalable data streaming platform and event ingestion service capable of receiving and processing millions of events per second. Examples of these type of events received at the event stack 104 may include data from IoT sensors received via an IoT gateway 102 or data from real-time social media feeds. Other types of events may include user interactions received via user interface 142, events received from other applications systems 107, events received from the blockchain 120, and events received from an off-chain storage 110. The event stack 104 may receive feeds from various sources. For example, the event stack 104 may receive a Twitter™ firehose feed of all Twitter™ notifications. In an example, the event stack 104 stores events in the order in which the events were received. In another example, the event stack 104 may receive a feed of stock quotes from a stock exchange. The event stack 104 may store the stock quotes in the order in which the events (e.g., sale or purchase of stocks, bonds and the like) occurred. Chronologically storing the events in the event stack 104 may allow one or more services, blockchain oracles or cryptlets, which are further described below, to process the events. The event stack 104 may receive events through a network.

In the system 100, cryptlets or oracles may be used to enable the processing of events on the event stack or for processing data generally on the system 100 or for processing events received from the blockchain and any source of events internal to the system 100 or external to the system 100. Cryptlets and oracles may include machine-readable instructions that may be executed on the blockchain or in secure enclaves outside the blockchain. The cryptlets and oracles may execute their machine-readable instruction in a secure enclave where the data is protected during execution of the code. In an example, components 115, 146 and 149 of the system 100 may be embodied as a cryptlet or an oracle. The system 100, may use cryptlets or oracles to perform the services provide by the input service 115, blockchain oracle 146 and the post processing service 149 or other services.

The system 100 may include an input service 115 to receive events, such as real-time events, messages from an IoT gateway 152, and events from other applications or systems 107. In an example, the input service 115 may process events received from external sources before sending the events to the event stack 104. In an example, the input service 115 may deploy the received events as messages addressed to a blockchain object on the blockchain 120. In an example, the message may be a second blockchain object addressed at a first blockchain object on the blockchain 120.

The event stack 104 may also interface with an Application Programming Interface (API) 106 that invokes generating a user interface 142 through a user interface generator 140. The user interface generator 140 may generate the user interface 142 to receive interactions from a participant. The system 100 may treat the interaction received from the participant as an event. In an example, the user interface 142 may be generated on a remote computer. The user interface 142 may be displayed on a screen in a web browser. The user interface generator 140 may queue events received from participants via the user interface 142 in the event stack 104 through the API 106.

Also, the input service 115 may receive an event from other systems. For example, the input service 115 may receive an event from other application systems 107. The input service 115 may also retrieve events from off-chain storage 110 and other services, as is further discussed below.

In an example, the API 106 may allow the system 100 to receive events at the event stack 104 from the user interface 142. The events may in examples identify a participant (e.g., a participant), provide authorization to interact with a blockchain object 108, identify a list of currently associated blockchain objects, generate new blockchain objects, provide documents for hashing, uploading to a blockchain, provide documents for storage on the off-chain storage 110, the blockchain object 108 details such as owner, the participants allowed to interact, offer price, etc. Although the user interaction is described with reference to the user interface 142, the system 100 may receive events from a participant through the command line, a holographic interface, a voice recognition system, from other systems 107 and the like.

In an example, the input service 115 in association with the API 106 may provide an interface to websites, mobile devices, and other systems to allow access to the blockchain 120 and/or the blockchain object 108. The system 100 may thus provide a service that may allow interaction between the blockchain 120 and participants using the API. For example, a mobile application may use the API to allow participants access to the blockchain 120.

Examples of services that may process the events queued by the event stack 104 may include a storage service 143, a blockchain service 188, a blockchain monitor 122, an analytics service 132, an integration service 134, etc., which are further discussed below. Also, the system 100 may process events, and determine whether to alter the state of the blockchain object 108 based on the events, as is further discussed below.

The storage service 143 may store the events in off-chain storage 110. Off-chain storage 110 refers to storage outside the blockchain 120. Examples of the off-chain storage 110 include databases, cloud storage services, data lakes, and the like. In an example, the system 100 may store events locally on a hard drive, and the storage service 143 may process the events before storing the events in the off-chain storage 110. In an example, the system 100 may use a post processing service 149 to process events before storing the events in the off-chain storage 110.

The storage service 143 may maintain a synchronized version of events on the blockchain 120 in the off-chain storage 110. For example, the storage service 143 may generate a hash of a new event that occurs on the blockchain 120 and store the event and the hash in the off-chain storage 110. The storage service 143 may generate a hash of each blockchain object on the blockchain 120 when new objects are added to the blockchain 120. The hashing service 144 may hash the blockchain object (i.e., event received from the blockchain 120) from the event stack 104 before storing the hash and the transaction to the off-chain storage 110. The hashing service 144 may use an SHA (Secure Hashing Algorithm) or any suitable cryptographic function to generate a hash of an input, such as an event. Also, the hashing service 144 may be used to hash an event, such as a blockchain object deployed on the blockchain 120. For example, when blockchain object 108 is deployed, it is hashed using the hashing service 144, to determine a hash 170 of the blockchain object 108. The storage service 143 may store the blockchain object 108 and the hash 170 in the off-chain storage 110. Hashes may be used to identify blockchain objects stored in the off-chain storage 110. Hashes may also be used to verify whether the blockchain objects stored in the off-chain storage 110 are the same as those on the blockchain 120. For example, the system 100 may compare the hashes of the same blockchain object stored on the blockchain 120 and the off-chain storage 110 to verify that the two objects are identical and has not been tampered with. In an example, the system 100 may store the hash 170 of the blockchain object 108 to the blockchain 120 instead of deploying the blockchain object 108, and the storage service 143 stores the hash 170 and the blockchain object 108 in the off-chain storage 110. Storing the hash of the blockchain object 108 instead of the blockchain object 108 itself on the blockchain 120 may allow the system 100 to execute the blockchain object 108 in a secure enclave in response to events on the blockchain 120 and deploy the new hash (e.g., the blockchain object 108 may have a changed state after execution) of the blockchain object 108 after execution on the blockchain 120.

In an example, the storage service 143 may store information on the off-chain storage 110 that may not be placed on the blockchain due to the immutability of the blockchain 120. For example, the personally identifiable information may be stored in the off-chain storage 110.

The event stack 104 may also receive an event (e.g., a blockchain object on the blockchain 120) from the blockchain monitor 122. For example, the blockchain monitor 122 monitors block updates, i.e., blocks as they are added to a blockchain 120. A block update may be a new block. The blocks may include files containing blockchain objects. The blockchain monitor 122 may retrieve a new block after it is posted to the blockchain 120, identify a plurality of events in a block update (i.e., a new block) in the blockchain, and queue the plurality of events on the event stack 104 for processing. In an example, the blockchain monitor 122 may monitor the blockchain 120 generated on a peer-to-peer network of nodes mining the blockchain 120 to generate a consensus on the new block with blockchain objects external to the system 100. The blockchain monitor 122 may receive a new block on the blockchain 120 published by a node of the peer-to-peer network external to the system 100. The peer may publish the new block after the node generates the new block based on a consensus protocol of the blockchain 120. Examples of consensus protocols for the blockchain 120 may include proof of work, proof of stake, gossip about gossip or the like. The blockchain monitor 122 may identify blockchain objects on the new block. In an example, the blockchain monitor 122 may generate an event for each blockchain object on the new block. Events may be queued on the event stack 104 from the blockchain monitor 122. The events may also be stored in the off-chain storage 110 by the storage service 143 as described above.

The event stack 104 may also interface with a blockchain service 188 that writes events to the blockchain 120. The blockchain service 188 may allow the system 100 to deploy selected events from the event stack 104 to the blockchain 120. For example, the system 100 may receive an event (e.g., an interaction from a participant) through the user interface 142 to deploy the blockchain object 108. The blockchain service 188 may then transmit the blockchain object 108 to a node on a peer-to-peer network of nodes mining the blockchain 120. The node may then generate a new block for the blockchain 120 based on the consensus protocol of the blockchain 120. As described above, the storage service 143 may also store the blockchain object 108 in the off-chain storage 110. The storage service 143 may also store hash 170 of the blockchain object 108 in the storage service 143.

The storage of events on off-chain storage 110 allows analytics services 132 and reporting and integration service 134 to use the data without additional steps to obtain blockchain object data from the blockchain 120. Examples of the analytics service 132 may include, PowerBI™, Azure™ Data Lake analytics, Azure™ Stream Analytics, machine learning analytics and the like. Also, the off-chain storage 110 augments the blockchain object 108 with contextual information about the blockchain object 108 not available on the blockchain 120. The contextual detail is available to services on the system 100 including services that are blockchain agnostic using the configuration file 198, which describes relationships between users, their roles, actions available to them, parameters of the blockchain object and the like. The reporting/integration service 134 may allow integration of the blockchain objects stored in the off-chain storage 110, the contextual details augmented by the configuration file 198 and a data repository 179 storing the values of the contextual information in accordance with the type information in the configuration file 198 with services that are not blockchain aware. The services that are not blockchain aware may access the events from the blockchain 120 from the data repository 179 storing all the values along with contextual information.

As discussed above, the system 100 may use the blockchain service 188 to deploy the blockchain object 108 to the blockchain 120. The system 100 may use the identity service 192 and the signing service 148 to cryptographically sign the blockchain object 108 before deploying the blockchain object 108 to the blockchain 120. The cryptographic signature of the blockchain object 108 may be the signature of blockchain object 108 generated using the private key 184 of a participant. Each object on the blockchain 120 may be cryptographically signed using the private key of one or more participants that create or interact with the blockchain object 108. In an example, a participant may generate an event (e.g., a message addressed to the blockchain object 108) and deploy the event to the blockchain 120 to interact with the blockchain object 108. The blockchain object 108 may receive the event and execute the blockchain object's machine-readable instructions (e.g., code 109) on a peer of a peer-to-peer network mining the blockchain 120. The blockchain object 108 may then change its state based on the interaction. In an example, the blockchain object 108 may store its current state as a final step of each execution. The peer on the peer-to-peer network may publish the blockchain object with the new state on a new block of the blockchain 120. If needed, the cryptographic signature of the participant who deployed the blockchain object 108 may be retrieved from a previous block of the blockchain 120. The cryptographic signature of the message may be detected from the message by examining the signature on the message and identifying the public key using the asymmetric property of cryptographic signatures. In an example, the system 100 may access a public database holding the public keys, associated names and email address of the participant to retrieve the off-chain identity based on the blockchain identity.

The system 100 may trigger a change to the blockchain object 108 by sending a message addressed to the blockchain 120 through the blockchain service 188. The message may be a second blockchain object deployed to the blockchain 120. The signing service 148 may sign the message using cryptographic keys of a participant (e.g., a buyer of an asset or a seller of an asset in a blockchain for selling an asset). For example, the system 100 stores, in memory 103, a private key 184 and a public key 186 of a particular participant interacting with the system 100. In an example, the message may be signed using the private key 184 of the participant. Thus, the system 100 can authenticate messages using the cryptographic function. Memory 103 is shown by way of example as a storage device that may store information for the system 100, including cryptographic keys and other information, but other types of storage may be used as well.

The input service 115 may process an event and place the event on the event stack 104 for deployment to the blockchain 120 through the blockchain service 188. In an example, the system 100 may use the hashing service 144, the signing service 148 or both to securely encrypt the confirmation message with the public key 186 of the participant to confirm receipt of consideration.

The system 100 may use the signing service 148 to sign a blockchain object, for example, using the private key 184 and the public key 186 from the memory 103. The system 100 may also generate a hash of the blockchain object and store the hash on the off-chain storage 110. The system 100 may then deploy the blockchain object through the blockchain service 188.

The identity service 192 may reduce the complexity of interacting with the blockchain 120 for a participant using the system 100 by associating an off-chain identify of the participant with a blockchain identity of the participant. In an example, the off-chain identity of the participant may be the first name and last name of the participant, the job title, the role, the organization unit, email address, phone number and the like of the participant in an organization. In another example, the participant may be a private individual identified by his role, email address, phone number and the like. The blockchain identity of the participant may be the private key 184 and the public key 186 of the participant. The identity service 192 may store the off-chain identity and the off-chain identity of the participant in the off-chain storage 110. In an example, the identity service 192 may generate metadata information in the off-chain storage 110 that maps the off-chain identity of the participant with the on-chain identity of the participant for the blockchain object 108. For example, the configuration file 198 may include definitions of the different roles within a specific context in the blockchain object 108. The identity service 192 may use the role information in the configuration file 198 for the blockchain object 108 and the context such as when the role is enabled for the blockchain object 108 to map the public identity and the private identity of the participant in the off-chain storage 110. In an example, the identity service 192 may store the mapping in the data repository 179 in the off-chain storage 110.

For example, assume a first participant works for a company selling a car and a second participant works for a company selling a loan for the purchase of the car. The company selling the car and the company selling the loan may be part of a consortium that uses the system 100 and the blockchain 120. The first participant and the second participant may be invited to join the consortium using their existing credentials. For example, the existing credentials may be their email address issued by the company. In an example, the system 100 may allow the first participant and the second participant to login. The system 100 may enforce authentication policies of the company selling the cars on the first participant. Also, the system 100 may enforce the authentication policies of the company selling the loans on the second participant. For example, an authentication policy of the company may require a participant to use two factor authentication.

In an example, the participant may log into the system 100 with an email address, which may be the participant's username. In an example, the system 100 may use a protocol such as the oAuth to authenticate the participant and receive a token that may be used to authenticate the participant a session. For example, the protocol may authenticate the participant using the Azure Active Directory service associated with the company of the participant. For example, for the first participant the system 100 may use the Azure Active Directory service of the first participant to authenticate the participant and to determine a token to authenticate the participant during the session.

In an example, during the first interaction with the system 100, the system 100 may generate a blockchain identity of the participant such as the private 184 and the public key 186. In an example, the blockchain identity of the participant may be an address on the blockchain 120 (e.g., Etherium blockchain). The system 100 may allow the participant to interact with the blockchain 120 using the token. The token may allow the system 100 to map the participant's off-chain identity to the blockchain identity of the participant using the metadata stored in the data repository 179.

Also, the system 100 may assign roles to the participant to allow access to the blockchain object 108. For example, a manager in a company selling cars may be identified as owner of the cars for sale. The system 100 may allow the owner to deploy the blockchain object 108 to sell cars, deactivate the listing on the blockchain 120 and the like based on the identity.

In an example, the identity service 192 may query the data repository 179 to determine contextual details of the participant, such as the participant's first name and last name, role 172 in the organization, persona 171 in the blockchain objects associated with the participant, and events associated with the participant. In an example, the system 100 may store the information in the data repository 179 using the configuration file 198. The metdata in the data repository 179 may allow the system 100 to identify the appropriate fields to populate, to index the contextual information for easy retrieval, and to provide a data repository that may be used by other services to seamlessly access the information on the blockchain 120 and associated objects. The contextual information in the data repository 179 may include information about the participant that may identify the participant to the system 100 and other participant interacting with the participant. For example, the contextual information about the participants may allow the system 100 to display the first and last name of one or more participants that interacted with the blockchain object 108 when the blockchain object 108 is presented on the user interface 142. For example, the participant (e.g., seller) may be shown the first and last name, and an option to contact the buyer, appraiser and/or inspector based on the contextual information.

In an example, the system 100 may allow use the off-chain identity to compartmentalize access to the information. For example, the system 100 may allow the participant to access the blockchain objects based on the role of the participant stored in the metadata on the data repository 179. In another example, the system 100 may restrict access to the participant based on the state of the blockchain object 108. For example, assume the appraiser may access the blockchain object 108 only after acceptance. The system 100 may enforce these access controls based on the metadata in the data repository 179 mapping the participants roles to the participants blockchain identity. For example, in the Etherium blockchain the blockchain object 108 may be a smart contract. The smart contract may have restrictions on who may interact with the object based on the status of the smart contract. For example, the blockchain object (e.g., the smart contract on Etherium) may allow interaction with only inspectors in one of the states. The system 100 may use the mapping in the data repository 179 to identify the participant, obtain contextual information about the role of the participant and allow the participant to interact only when the role of the participant matches the restrictions imposed by the blockchain object on the role of the participant. For example, in a smart contract written in Solidity language and targeted for the Ethereum blockchain, code generation could deliver Modifier functions that implemented role-based access control to certain functions within the contract.

In an example, the system 100 may receive contextual details of the participant through the user interface 142. Also, the identity service 192 may also link the off-chain identity and the blockchain identity of the participant by storing these details in the data repository 179. For example, the identity service 192 may map the participant's off-chain identity with the blockchain identity on the data repository 179. In an example, identity service 192 may store the metadata such as the mapping of the off-chain identity and the on-chain identity to the participant's blockchain identity such as the participant's private key 184 and public key 186. In an example the participant's off-chain identity may be a user specific ID that is associated with one or more external ids. For example, an id that maps to the Azure Active Directory, a mac address for a device, an active directory service on a machine or the like. Based on the stored metadata, the system 100 can determine when the off-chain identity and the blockchain identity of the participant match by retrieving the mapping information from the metadata store and verifying the information in order to facilitate interactions with a deployed blockchain object. Also, the identity service 192 may use the metadata in the data repository 179 linking the real-world identity and the blockchain identity (e.g., in the data repository 179 with the two fields) to remove the participant from the system 100 and revoke access to the blockchain 120. For example, the system 100 may remove a participant who is no longer authorized to interact with the blockchain 120 on behalf of the company in a consortium.

The signing service 148 may use the private key 184 of the participant to sign the blockchain object 108, and the blockchain service 188 deploys the signed blockchain object 108 on the blockchain 120. The identity service 192 or another component of the system 100 may determine whether the participant with a particular off-chain identity is authorized to deploy the blockchain object 108. For example, the system 100 may use context schema 196 to determine persona 171 of the participant, and the system 100 may determine whether the participant is allowed to deploy a blockchain object based on the persona 171 and/or role 172 of the participant.

In an example, the system 100 may use the identity service 192 to authenticate the identity of a participant on the blockchain 120. For example, after the blockchain object 108 is deployed on the blockchain 120, the system 100 may receive an event from the blockchain object 108 that requests verification of the identity of a participant. The system 100 may receive the event from the blockchain object 108 through the blockchain monitor 122. The event includes the cryptographic signature of a participant associated with the event, which may be provided in a message to the blockchain object 108 from the participant. The system 100 may use the cryptographic signature of the participant from the event to identify the off-chain identity of the participant. For example, the system 100 may use a username and password for the participant to authenticate the participant and associate the participant's blockchain identity with the participant's off-chain identity. The system 100 may support other authentication schemes over the network such as OAuth protocol and the like.

The memory 103 may store the context schema 196, the private key 184, the public key 186 and blockchain object template 111. In an example, the context schema 196 may include a parameter specification of the blockchain object 108. The parameter specification may include parameters or variables that describe who may interact with the blockchain object, when they may interact, how they may interact, what are the parameters of the interaction, the purpose of the interaction and the like. The parameters may include acceptable types for the information. The context schema 196 may describe a hierarchy of a blockchain object, state, action, persona, role, and other contextual details. The system 100 may create an instance of the context schema 196, i.e., configuration file 198. For example, the configuration file 198 as shown inherits the hierarchy of the state list 176 containing the actions 178 in each state of the state list 176 and the actions 178 including the personas 171 who may perform the action and the parameters 175 of the actions. For example, the system 100 can populate the data repository 179 with values of the parameters, states, actions, personas etc., described in the configuration file 198. In an example, the system 100 may generate a customized instance of the context schema 196 and store this instance as the configuration file 198 that may include customizations such as the parameters specifications, action specifications, state lists, action lists, personas who may interact and the like for a blockchain object. In an example, the system 100 may store the configuration file 198 for the blockchain object 108, the blockchain object 108 and a hash 170 of the blockchain object 108 in the off-chain storage 110. The difference between the context schema 196 and the configuration file 198 may be the customized parameters and the types specific to a particular blockchain object. The system may store the values of parameters in the configuration file 198 in the off-chain storage (e.g., in the data repository 179).

The configuration file 198 may be used to create the blockchain object 108. Values of one or more of the parameters in the configuration file 198 may be received via the user interface 142 to create the blockchain object 108. The values received may be stored in the data repository 179 using the contextual information such as type information in the configuration file 198. In an example, the user interface 142 may also be used to receive values and/or constraints for interacting with the blockchain object 108, and the constraints may be stored in the configuration file 198, and the values may be stored in the data repository 179.

The system 100 may use the contextual details of the participant, to generate the appropriate user interface for the participant. For example, to create the blockchain object for deployment the system 100 may use the configuration file 198 to determine the parameters of the initial state of the blockchain object 108, and the actions available in the initial state, and the parameters associated with the actions in the initial state for the blockchain object. For example, the initial state of the blockchain object may be part of the state list 176, the actions available to the participant in the action list 178 and the parameters for the action may also be available in the configuration file 198. Also, the off-chain storage 110 may include the data repository 179 with contextual information about the participant The system 100 may thus display the user interface 142 with all contextual information of the blockchain object in the initial state that may facilitate the participant's decision making. The information displayed may be based on the contextual information about the initial state such as the information already available about the blockchain object, default information for some types of parameters of the blockchain object (e.g., a description of a car and model assuming the blockchain object is for sale of a car). The user interface 142 may also generate user interface elements such as buttons and entry fields based on the type of the parameter requested. For example, a yes or no decision or a decision with a fixed set of choices may be presented as a button or a drop-down list with the appropriate label from the configuration file 198. A request for a numeric quantity (e.g., a type integer) or name or description (e.g., a type string) may be presented using an input text box.

Blockchain object templates, such as blockchain object template 111 in association with the context schema 196 or the configuration file 198, may be used to create blockchain objects. The blockchain object template 111 may include the machine-readable instructions for the blockchain object (e.g., code 109 for the blockchain object 108). For example, the blockchain object template 111 may be associated with a configuration file 198. The configuration file 198 may describe the states of the blockchain object, the actions of the participants in each state, the persona of the participant who may interact with the blockchain object in each state and the role of the participant and the like. For example, the state list 176 may provide a series of states or a state map and the next states from a particular state. The actions of the participant who initiates the blockchain object in the initial state may be retrieved from the actions list 178. The parameters of the action and the types for these parameters may also be obtained from the configuration file 198. This information may be described as the contextual information of the blockchain object. Also, the system 100 may include contextual information about the participant in the data repository 179.

The user interface generator 140 may generate the user interface 142 using the contextual information from the configuration file. The user interface generator 140 may display the user interface 142, and a participant may enter values for parameters as specified in the configuration file 198 associated with the blockchain object template 111 via the user interface 142. The system 100 may create the blockchain object 108 using the machine-readable instructions in the blockchain object template 111. The event stack 104 may receive the values and initialize the blockchain object 108 with the values. The system 100 may store different blockchain object templates for different types of workflows, which may include code for different types of blockchain objects. In an example, the system 100 may select a template that corresponds to the type of blockchain object being created based on the role or persona of the participant. Also, a selected blockchain object template may be instantiated with information from the off-chain storage 110 (e.g., the data repository 179). For example, the system 100 may determine based on the off-chain identity of the participant, the role of the participant logged into the system 100 and constraints on the interactions with the blockchain based on the role of the participant. The system 100 may then select the appropriate blockchain object template for the template and may place constraints on values that can be instantiated for parameters in the selected template based on the constraints for the participant. The parameters in the selected template may be provided from the context schema 196 or configuration file 198.

In an example, the event stack 104 may receive values for parameters in the configuration file 198 from the blockchain oracle 146. For example, the off-chain storage 110 may include many of the values that are predetermined for the participant logged into the system 100. For example, the blockchain identity of the participant and the associated off-chain identify may be stored in the memory 103 or the data repository 179. The blockchain identity may include a cryptographic key, roles of the participant, and constraints on interactions with blockchain objects that may be used for creating and deploying and managing interactions with the blockchain object 108.

The system 100 may use the blockchain service 188 to deploy the blockchain object 108 to the blockchain 120. The system 100 may use the identity service 192 and the signing service 148 to cryptographically sign the blockchain object 108 using the public 186/private 184 keys of the participant before deploying the blockchain object 108 to the blockchain 120. The system 100 may also use the private key 184 and the public key 186 of the participant to authenticate events to and from the blockchain 120. Once deployed, the system 100 may receive an address from the blockchain 120. The address uniquely identifies the blockchain object 108 on the blockchain 120. The system 100 may store the address in the data repository 179. The system 100 may also store information such as the location of the blockchain object 108. For example, the identity of the blockchain 120 where the blockchain object 108 is deployed. In an example, the system 100 may deploy dependencies for the blockchain object 108 before deploying the blockchain object 108. For example, the system 100 may deploy a cryptlet or oracle to retrieve real-time data from one or more external sources on a periodic basis before deploying the blockchain object 108. Also, the system 100 may use the storage service 143 to store the blockchain object 108 along with the configuration file 198 in the off-chain storage 110. The off-chain storage 110 may store hashes, such as the hash 170, to verify the data stored on the off-chain storage 110 matches the blockchain object 108 deployed to the blockchain 120. The system 100 may use a blockchain ID (identifier) 174 of the blockchain to choose the blockchain for deploying the blockchain object 108. For example, the system 100 may use a unique ID for each blockchain such as a unique ID for Ethereum™.

In an example, the deployed blockchain object 108 may be executed simultaneously on virtual environments on distributed peers depending on the type of blockchain. Also, the system 100 may deploy the blockchain object 108 on a blockchain without support for the blockchain object 108. For example, the blockchain object 108 may be deployed as cryptlets, and the cryptlets may run in secure enclaves on secure computers that may be off-chain. The cryptlets running in secure enclaves may be hashed, and the hash deployed on the blockchain without support for the blockchain object 108 executing on a peer of the peer-to-peer network mining the blockchain 120. Thus, the system 100 may support the use of blockchain objects with machine-readable instructions on different blockchains with and without support for blockchain objects with machine-readable instructions that may be executed on a peer of the network of peers mining the blockchain.

The system 100 may receive an event from a source external to the system 100 through the input service 115. For example, the input service 115 may receive interest rates periodically. Assume the blockchain object 108 uses the interest rates to determine payment to an entity; the system 100 serves as a bridge between the external world and the blockchain object. The input service 115 may digest the event, identify the blockchain object 108 that may use the event and place the event on the event stack 104. The blockchain service 188 may retrieve the event from the event stack 104 and deploy the event to the blockchain object 108 as a message addressed to the identified blockchain object 108. In an example, the input service 115 may receive events (e.g., interactions from the participant) from the user interface 142 to perform actions on the blockchain object 108 In another example, the API 106 may receive events from the user interface 142 to perform actions on the blockchain object 108 and place the events on the event stack 104. The input service 115 may place these events on the event stack 104 for processing. The event stack 104 may provide for a queue of events that may be processed by the different services on the system 100.

In an example, when the system 100 receives an event from the participant to sell a car on the blockchain 120, the system 100 may identify the participant using the identity service 192. Once the participant is identified, the system 100 may retrieve further events from the off-chain storage or the blockchain 120 to identify events associated with the identified participant. Based on the context generated from these events and the context schema 196, the system 100 may use the user interface generator 140 to display a user interface 142 to the participant. For example, based on the state of the blockchain object 108, the screens may vary. The configuration file 198 may provide contextual information about the user interface to use based on the state of the blockchain object 108. For example when the state of the blockchain object 108 is pending inspection, the seller may have the actions accept, terminate and reject (see, e.g., FIGS. 8-9). The system 100 may show the user interface shown in the FIGS. 7 and 8 based on the state of the blockchain object 108.

After deployment of the blockchain object 108 to the blockchain 120, the system 100 may provide an interface between an event and the blockchain object 108 using messages addressed to the blockchain object 108. The blockchain object 108 on the blockchain 120 may receive an event as a message addressed to the blockchain object 108, and system 100 may store the event in the off-chain storage 110.

The system 100 may provide an interface between the event stack 104 and the blockchain object 108 based on the context schema 196. For example, the system 100 may use the event stack 104 to receive an event that may affect the blockchain object 108 after it is deployed on the blockchain 120. The event may be received from the user interface 142, IoT gateway 102, other applications/systems 107, blockchain oracle 146, blockchain monitor 122, blockchain service 188, etc. For example, the event may be a commodity price, an interest rate, a participant interaction with the blockchain object 108, etc. that affects the blockchain object 108. The system 100 may use the configuration file 198, which stores parameters types and constraints for the blockchain object 108, to determine whether the event may affect the blockchain object 108 and updates the blockchain object 108 accordingly. Also, the system 100 may use the input service 115 to determine whether an event received from the blockchain 120 through the blockchain monitor 112 invokes a change in the state of the blockchain object 108. For example, the blockchain object 108 may change its state based on an interaction from a participant external to the system 100 on a node of the peer-to-peer network participating in the blockchain 120. Also, the blockchain object 108 may deploy a message to a new block on the blockchain 120 to receive an additional parameter. For example, the system 100 may deploy an object on the blockchain 120 with an address linked to the blockchain identity of a participant. The blockchain object 108 may deploy a new blockchain object addressed to the blockchain object linked to the blockchain identity of the participant to request a parameter form the system 100. For example, in the event of a conditional offer from a buyer, the blockchain object 108 may request an additional parameter such as an acceptance or rejection of the conditional offer. In another example, an exception due to the parameters exceeding a threshold may request an additional parameter from the system 100. The system 100 may monitor the plurality of events in the new block of the blockchain 120 to identify an event associated with the blockchain object 108 or a participant in the system 100 and place the event on the event stack 104.

The configuration file 198 may also describe the properties of the blockchain 120 on which the blockchain object 108 is deployed, a state map with the current state, possible actions of the blockchain object 108, parameters for the actions, personas that may be involved in the actions, and content that may be displayed in the user interface 142 that is associated with interacting with the blockchain object 108. A participant may generate an event (e.g., a message addressed to the blockchain object 108) to interact with the blockchain object 108 through the user interface 142. The user interface generator 140 may vary the user interface 142 based on the current state of the blockchain object 108, the persona of the participant interacting with the blockchain object 108, and the properties of the blockchain object 108. For example, the user interface 142 may display one GUI for a participant with the persona of a seller and may display a different GUI for a participant with the persona of a buyer. Each GUI may allow the user to perform a particular action (e.g., accept an offer, reject an offer and the like) associated with the blockchain object 108 depending on constraints that may be specified in the configuration file 198. The configuration file 198 may include a user interface (UI) list 173 that includes details of the GUIs to display depending on a variety factors, such as persona, state of the blockchain object 108, available actions of the blockchain object 108, a list of parameters 175 of the actions, the blockchain where the blockchain object 108 is deployed or is about to be deployed, participant context information and the like.

Once deployed the blockchain object 108 may change its state based on messages addressed to the blockchain object 108 from different participants. In an example, a participant may interact with the blockchain object 108 independent of system 100. In another example, the participant may interact with the blockchain object 108 through the system 100. For example, assume the blockchain object manages and enforces constraints between participants during a sale of an asset. The system 100 may be used by the seller of the asset to deploy the blockchain object 108 to the blockchain 120. A buyer may then interact with the blockchain object 108 through the system 100 or another system that is isolated from the system 100. In another example, the system 100 may be shared by the buyer and seller, but the data of the seller and the buyer may be isolated using their off-chain identities.

The system 100 may receive a plurality of events at the event stack 104. For example, the system 100 may receive events that pertain to the sale of the asset, such as an offer from a buyer participant. The blockchain monitor 122 may identify the event in the event stack 104 as an event that may affect the blockchain object 108. The system 100 may generate a notification for display to the participant whose action may be impacted by the event. The system may receive a response from the participant using the user interface 142. The system 100 may then generate a message addressed to the blockchain object 108 based on the identified event and the response from the participant. The system 100 may use the blockchain service 188 to deploy the message to the blockchain 120. In an example, assume the system 100 receives an appraisal from an appraiser via another system 107 (e.g., an email message). The system 100 may use the input service 115 to determine the identified event may affect the blockchain object 108. The system 100 may then generate a message addressed to the blockchain object 108 based on the identified event to the blockchain 120. In an example, the blockchain monitor 122 and/or the input service 115 may identify the event based on the configuration file 198 and information in the data repository 179 for the blockchain object 108. For example, the configuration file 198 may include details in the state list and the action list for that state and parameters that may cause a change in the state. The values of the parameters, the current state, pervious state etc., may be stored in the data repository 179. The system 100 may check the parameters in the configuration file 198 against the variables in events to determine events that may change the state of the blockchain object 108.

In some instances, the blockchain object 108 may change state due to interactions with one or more participants independent of the system 100. In these instances, the system 100 may receive notification of the change in state and may store the change in state (e.g., the blockchain object 108 with the changed state) in the off-chain storage 110, so an image of the blockchain object 108 with the latest state deployed on the blockchain 120 is stored in the off-chain storage 110. For example, the system 100 may receive a block update from the blockchain 120 indicating a change in state in the blockchain object 108. The system 100 may determine a plurality of events in the block update and store the events on the event stack 104 for processing by services of the system 100. In an example, the system 100 may determine whether an event in the block update changes the state of the blockchain object 108. In response to a determination that the event in the block update changes the state of the blockchain object 108, the system 100 may then update the state of the blockchain object 108 on the off-chain storage 110. The system 100 may notify a participant associated with the blockchain object 108 through the user interface 142 regarding a change in state of the blockchain object 108 and may facilitate the participant to interact with the blockchain object 108 via the user interface 142.

Also, a second blockchain object may address the blockchain object 108. Objects on the blockchain may interact with each other for different reasons. For example, a blockchain object may be a utility object that provides specific information to the blockchain object 108. Assume, an interaction is constrained with security locks from two participants. A utility object on the blockchain 120 may determine whether the security locks have the necessary state for both the participants. In another example, the system 100 may determine whether an event for a block update to the blockchain object 108 includes a second object (e.g., a utility object) addressing the blockchain object 108. The system 100 may determine the context of the interaction between the blockchain object 108 and the utility object. The system 100 may then place an event on the event stack 104 for other services to process the interaction. The system 100 may store the event on the off-chain storage 110, and the system 100 may use the event to determine the actions available to a participant for the blockchain object 108.

The system 100 may receive a request from the blockchain object 108. In an example, the blockchain object 108 may deploy a message to the blockchain to request additional information such as a parameter in a smart contract, a request to authenticate a participant in a transaction, a request for information from a participant and the like. For example, the blockchain object 108 may request the current interest rates. The system 100 may receive the request as an event at the event stack 104. Examples of a request may include a request for authentication of a participant, request for a decision on a conditional acceptance, request for a further description of an asset for sale, request for a set of instructions to handle an exception and the like. In an example, the system 100 may receive a block update from the blockchain 120. The system 100 may identify a plurality of events in the block update. The system 100 may then determine whether the block update includes a request from the blockchain object 108 for information, such as a parameter in a smart contract. For example, the system 100 may determine whether the plurality of events includes a request from the blockchain object 108. The system 100 may generate a message addressed to the blockchain object 108 with the requested information. The system 100 may transmit the message addressed to the blockchain 120. For example, the blockchain service 188 may deploy the message to the blockchain 120. Thus, the system 100 may provide an interface for the blockchain object 108 to request an event. Examples of requests received from the blockchain object 108 may include requests for a parameter, requests on how to handle exceptions, notifications of exceptions, and the like.

The system 100 may receive a block update from a blockchain at the event stack 104. The system 100 may identify the blockchain object 108 in the block update. For example, the blockchain object 108 may change state. The blockchain object 108 with the new state may be stored on a new block in the blockchain 120. The system 100 may determine a cryptographic signature of the blockchain object 108. For example, the system 100 may determine the public key 186 that corresponds to the private key 184 used to generate the cryptographic signature of the blockchain object 108 from a database of public keys that are authenticated. For example, public keys may be stored and authenticated in a circle of trust and placed online in a database accessible by anyone. A public key may be used to identify the blockchain identity of the participant associated with the blockchain object. The system 100 may determine a participant associated with the blockchain object 108 based on the cryptographic signature and the context schema. The system 100 may then determine a GUI for the blockchain object 108 based on the context schema 196. The system 100 may display the GUI in the user interface 142 to allow the identified participant to interact with the blockchain object 108.

The system 100 may use the hashing service 144 to generate the hash 170 of the blockchain object 108 before deploying the blockchain object 108 and/or the hash 170 to the blockchain 120. In an example, the system 100 may deploy the hash 170 of the blockchain object 108 to the blockchain 120 instead of the blockchain object 108. Deploying the hash 170 instead of the blockchain object 108 may allow the system 100 to deploy the blockchain object 108 to multiple blockchains. Also, the hashing service 144 may be used to include references of data in the off-chain storage 110 to prove chain of custody, proof of custody and proof against tampering. In another example, the system 100 may deploy the hash 170 of the blockchain object 108 on public blockchains, consortium blockchains and the like. For example, the system 100 may deploy the blockchain object 108 on a consortium blockchain and deploy a hash of the blockchain object 108 in place of the blockchain object 108 on public blockchains or other systems outside the consortium blockchain. Thus, the system 100 may allow the use of the blockchain object 108 on the public blockchain, without disclosing the contents or code of the blockchain object 108. However, the hash 170 of the blockchain object 108 may serve as immutable proof of the state of the blockchain object 108. The system 100 may allow the blockchain object 108 to be used for services on the cloud by deploying the hash 170 of the blockchain object 108 and sharing the blockchain object 108 on a cloud service between participants. For example, the system 100 may share the blockchain object 108 privately with the participants who have access to only the public blockchain through other services on the system 100. The events are proofed using hashes stored in the public blockchain, and the blockchain object 108 may be provided as a cloud service.

In an example, the hashing service 144 may be used to establish proof of chain of custody, proof of possession of a digital asset and/or proof against tampering. For example, the hashing service 144 may store the hash of a document on the blockchain. The hash of the document is a destructive process that uniquely identifies the document, however, does not allow the recreation of the document. Thus, the hashing service 144 may be used to store digital assets in the off-chain storage 110 while establishing custody of digital assets that may include personally identifiable information. In an example, the hash may be used to verify the digital asset has not been modified or tampered with.

In an example, the hashing service 144 may determine the hash of a digital asset and place the hash on the blockchain 120. The blockchain object 108 may validate the digital asset has not tampered, establish a chain of custody and proof against tampering. In an example, the digital asset may be a picture. The hashing service 144 hash the picture and deploy the hash of the picture on the blockchain 120. The hashing service 144 may be used to determine whether the picture was modified or tampered by determining the hash of the picture at a later date. A change in a byte of the picture will produce a different hash. Thus, the authenticity of the images may be established.

In an example, assume the blockchain object 108 regulates interaction between participants for certified organic produce. The hashing service 144 may hash a certificate for the produce and place the hash of the certificate on the blockchain 120.

In another example, the hashing service 144 may be used to hash the audio/video recordings captured by law enforcement agencies and deploy the hash to the blockchain. The hash on the blockchain is immutable and may serve as proof of custody of the audio/video recordings, also serve as proof of possession at the time the hash was deployed to the blockchain 120 and also provide proof against tampering at a later date.

Similarly, the hashing service 144 may be used to hash a file available for rapid prototyping (e.g., 3D printing), a video or audio licensed (e.g., movies purchased on an Xbox) to a participant, clinical trial reports and the like. The system 100 may then deploy the hash to the blockchain 120. For example, in the case of clinical trial reports, the hashes or history of hashes may be used to verify the reports are intact and were not tampered with. The system 100 may thus improve the efficiency of regulatory processes.

In an example, data may be stored on the off-chain storage 110, because the data is inappropriate for storage on the blockchain 120. For example, personal history files, files with personally identifiable information, medical records and the like. The hashing service 144 may be used to store a hash of the data stored in the off-chain storage 110 to authenticate proof of possession at the time the hash was deployed to the blockchain 120, proof against tampering and proof of chain of custody and the like.

In an example, data from government records may be hashed and placed on the blockchain 120. For example, land ownership records, motor vehicle registration records, licensure information (e.g., doctors, pharmacists, lawyers and the like), change of name information, tax receivables and the like may be hashed using the hashing service 144 and the hashes deployed on the blockchain 120. Thus, the confidence in government records may be increased while reducing the cost of maintaining these records. The hashing service 144 may be used to identify any anomalies in the records. For example, before a real estate is purchased, the land records may be verified using the hashing service 144. Thus, the hashing service 144 may be used for proof of chain of custody, proof against tampering and proof of possession.

3*f*. Example of Use of Identity service 192 to Link Off-Chain Identity with Blockchain Identity of a participant The identity service 192 may reduce the complexity of interacting with the blockchain 120 for a participant of the system 100. For example, the blockchain identity of the participant may be linked to their off-chain identity such as the first name and last name, an identifier of the role and organization of the participant. The system 100 may create an instance of the context schema 196, i.e., configuration file 198 during deployment. The system 100 may display a user interface 142 to populate an off-chain storage 110 using the configuration file 198 along with the data repository 179 to obtain the context and to associate participants with their personas and their roles. The configuration file 198 along with the data repository 179 in the off-chain storage 110 may associate the persona 171 with a participant on the system 100. In other words, associate an identity or username of the participant with a persona describing the relationship between the participant and the blockchain object 108. For example, assume the blockchain object 108 is a smartlet for a sale of a car, and the persona of the participant in the system trying to sell the car may be a seller. The configuration file 198 along with the data repository 179 in the off-chain storage 110 may associate the participant with the persona in the configuration file 198. Associating the participant with this persona allows the participant to deploy the blockchain object 108 to the blockchain 120 to sell the asset. Since the participant is initiating the event, the role 172 of the participant may be that of an initiator. The configuration file 198 may serve a map to retrieve the information from the data repository 179 on the off-chain storage 110 to identify the participant. The configuration file 198 along with the data repository 179 may store the blockchain identity of the participant, the information about the persona who may deploy the blockchain object 108, a state list 176 of the blockchain object 108 listing all possible states of the blockchain object 108, and an action list 178 listing the allowed actions of each persona in each state. The system 100 may receive an event associated with the blockchain object 108 through the user interface 142 and the API 106. For example, through the API 106, the system 100 may receive details about the asset from the participant. In another example, the system 100 may receive an event from the input service 115 or may receive an event from a database of used car prices that can provide pricing event for a used car to be offered for sale.

The system 100 may use a cryptlet or an oracle or other code for post processing events before the event is stored in the off-chain storage 110. The blockchain oracle 146 may retrieve event at periodic intervals based on a set of rules from a storage system or from other sources such as live feeds of the event. In an example, the blockchain oracle 146 may be used to periodically scan the events stored in the off-chain storage 110 and trigger actions based on changes to the off-chain storage 110. For example, the off-chain storage 110 may receive new documents, and this may trigger a new event. The new event may be placed on the event stack 104 to be retrieved by other services. Also, post processing service 149 may process the events that are queued by the event stack 104 to identify the relevant events. The post processing service 149 may run in a secure enclave and write the attestable activity to the blockchain 120. In an example, the post processing service 149 may write the attestable activity to a consortium blockchain. The consortium blockchain may not allow access to off-chain storage 110 other than through a cryptlet or an oracle due to security restrictions.

The system 100 may also manage the blockchain object 108 after it is deployed on the blockchain 120. The blockchain monitor 122 may retrieve events from the blockchain 120 as events are posted on new blocks on the blockchain 120. The retrieved events from the blockchain 120 may be passed to the event stack 104.

In an example, the system 100 may store in the data repository 179. In an example the data repository 179 may be divided into three data repositories, namely the meta data store, transactional store and the reporting store.

The metadata store may store configuration for blockchain object 108. The user interface generator 140 may use the meta data to generate user interfaces. The metadata store may also store information about the role information associated with the blockchain object 108. In an example, the role information may be used to allow access control for the participants of the system 100 based on the role information.

The transaction store may store the location where the blockchain object 108 is stored in the blockchain 120, the transaction requests (e.g., offer for sale or counter-offer and the like), properties of the blockchain object 108 (e.g., state, who may interact, how to interact, the format of the messages, the format of the interaction and the like), the blockchain identities of the participants, the blockchain identities of the participants who requested the transactions (e.g., offer for sale or counter-offer and the like), the identity of blocks in the blockchain where the transactions were requested and the like.

The reporting store may include a combination of the information in the metadata store, the transactional store that may be structured using the procedures and constructs such as the logic expressed in the configuration file 198 (e.g., logic for the blockchain object 108). For example, the reporting store may allow the structuring of events in the data repository 179. The structing of the events in the data repository 179 may allow the data to be queried by services that are not designed to interact with the blockchain. For example, analytics and/or reporting services may access the structured data in the reporting store.

Additionally, the input service 115 may receive events from other external sources to manage the blockchain object 108 after being deployed. The sources may include cryptlets or other sources such as IoT gateway 152 or the systems/applications 107. Information from the sources are authenticated and received via the input service 115 may be used by the system 100 to post messages to the blockchain object 108 on the blockchain 120. For example, the blockchain object 108 may offer a car for sale on the blockchain 120 provided the car has not been offered in another off-chain auction. The input service 115 may receive regular updates about the off-chain auction and when confirmation is received from the off-chain auction that the car has been sold via the auction, the system 100 may send a message to the blockchain object 108 to change the status of the blockchain object 108 to indicate the car is no longer available for sale. The system 100 may post a message to the blockchain object 108 by posting a message to the blockchain 120.

The event stack 104 along with blockchain monitor 122 may be used to synchronize changes of state and events for the blockchain object 108 between the blockchain 120 and the off-chain storage 110. Similarly, the storage service 143 may synchronize any changes to blockchain object 108 originating from the system 100. The storage service 143 may store a copy of the blockchain object 108, transactions on the blockchain 120, states of the blockchain object 108, hash 170 of the blockchain object 108 and subsequent hashes if the blockchain object 108 is changed, and the configuration file 198 on the off-chain storage 110. A hash may be used to indicate a state of the blockchain object 108 on the blockchain 120 at a particular point in time. The system 100 may use the hashes to determine whether the data stored in the off-chain storage 110 matches the data stored in the blockchain 120.

The system 100 may retrieve events from the off-chain storage 110, the blockchain 120, and/or both. The system 100 may generate contextual information from the events using the configuration file 198. For example, the system 100 may also use the identity service 192 to identify a participant associated with the events received from the blockchain 120 based on cryptographic signatures of the retrieved events from the blockchain. Also, the time stamps of retrieved objects or events may provide additional context of the event. The additional context may include details such as the role of the participant in a retrieved event such, the status of the blockchain object 108, the future states for the blockchain object 108, additional inputs for the change of state of the blockchain object 108 and the like. Thus, the system 100 also manages the blockchain object 108 when changes are triggered by the blockchain object 108 by deploying a new blockchain object in the block update of the blockchain 120.

The off-chain storage 110 may be linked to cryptlets or oracles as discussed above. For example, the off-chain storage 110 may have associated services that trigger event notifications periodically or when certain changes occur. For example, the off-chain storage 110 may trigger a change when changes are made to documents stored in the off-chain storage 110. For example, if a loan approval is received as a change to a document, it may trigger approval of an event for the blockchain object 108 that is dependent on the loan approval. In an example, the event may be received by the event stack 104. The system 100 may utilize the event to identify the blockchain object 108 that may be notified of the change using the configuration file 198. The identity of the blockchain object 108 may be stored in the data repository 179 in the off-chain storage 110 and may be accessed using the schema describe in the configuration file 198 along with the type information for the information to obtain context. The system 100 may trigger a change to the blockchain object 108 by sending a message to the blockchain 120 through the blockchain service 188. The signing service 148 may sign the message using the keys of a participant. In an example, the message may be signed using the private key 184 of the participant. Thus, the system 100 can effectively manage the blockchain object 108 on the blockchain 120.

Although system 100 is described with reference to generating user interface 142 for interaction with one or more participants of the system, the system 100 may be used in another embodiment without the portal to create, authorize, manage and deploy the blockchain object 108 to the blockchain 108. In an example, the system 100 may allow one or more components to be used to allow interaction between the blockchain object 108 and other services or applications. Examples of other services include Product as a Service (PaaS), Infrastructure as a Service (IaaS), and System as a Service (SaaS). For example, the system 100 may allow a machine-based interaction to create, authorize, manage and deploy the blockchain object 108 In an example, authorize may mean authorizing participants to deploy specific instances of blockchain object 108 or interacting with an already deployed blockchain object 108 on the blockchain 108.

Figure 4A:
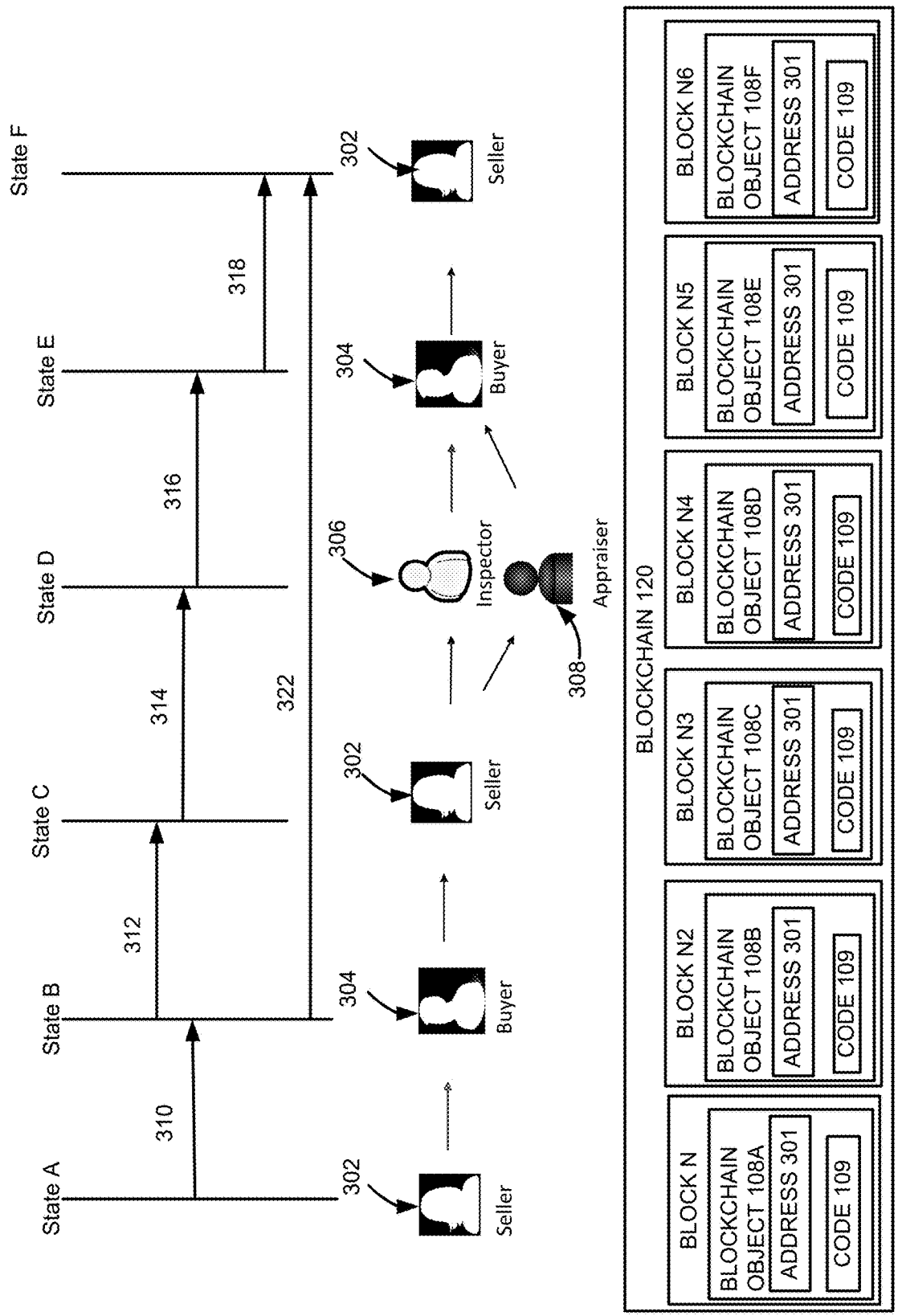
FIGS. 4A-B illustrate examples of state transitions between different states of a blockchain object, according to an embodiment of the present disclosure.
Figure 6:
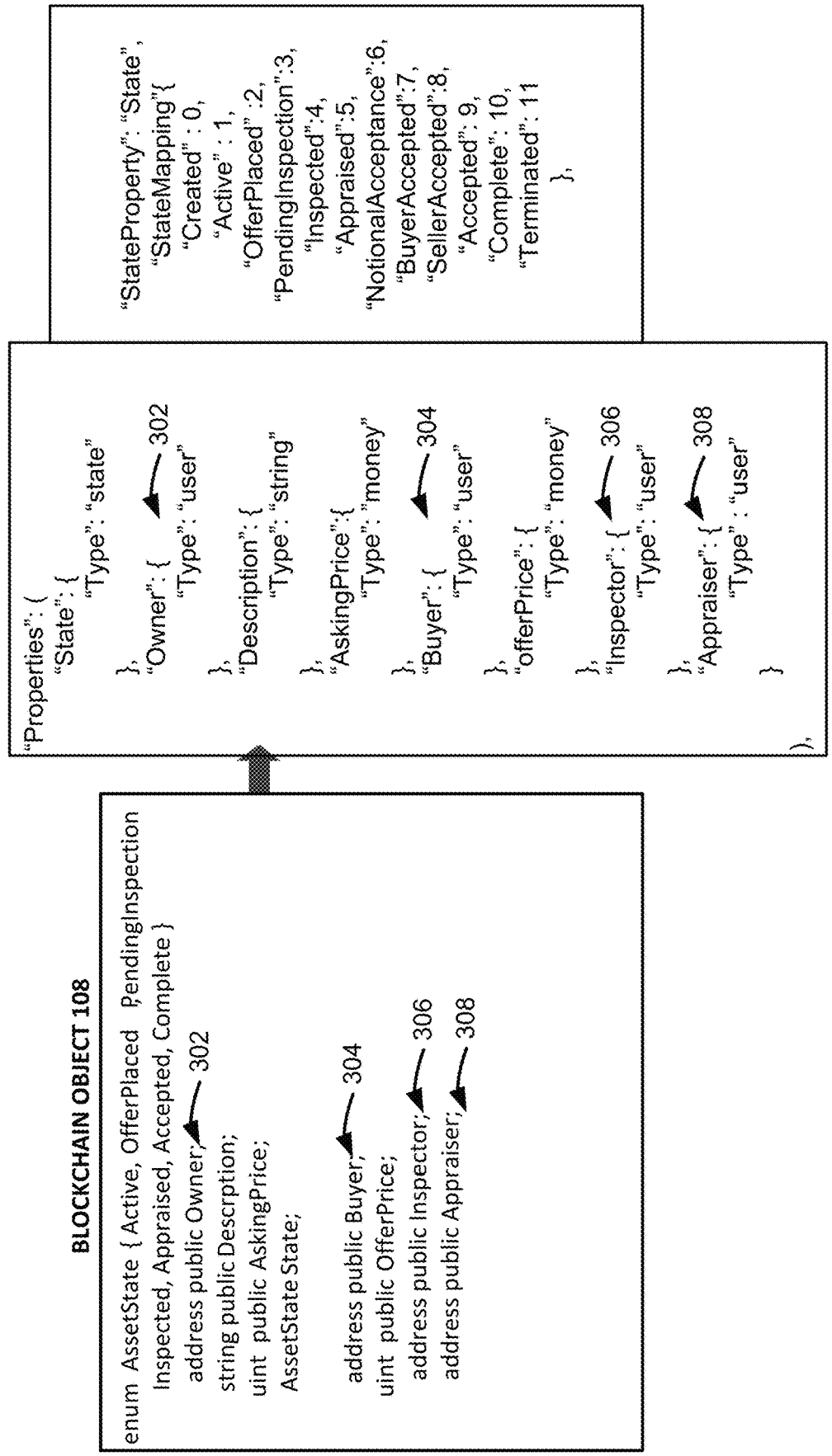
FIG. 6 shows an example of a blockchain object and a corresponding context schema instance, according to an embodiment of the present disclosure.

FIG. 4A shows an example of states of the blockchain object 108 tracked by the system 100. In this example, assume the blockchain object 108 governs interactions between participants during the sale of an asset. The blockchain object is generated, deployed and managed by the system 100. The blockchain object 108 may include machine-readable instructions to govern the interactions between participants. The blockchain object 108 may also store the current state of the asset. FIG. 4A shows an example whereby the system 100 tracks six states A-F for the blockchain object 108 (shown as 108 A-F). For example, the blockchain object 108 may transition between six different states before the conclusion of the sale of the asset. State A depicts an offer for sale of the asset from seller 302 to buyer 304. State B is a conditional acceptance subject to inspection, from the buyer 304 to the seller 302. State C is a request for inspection from the seller 302 to an inspector 306 or a request for appraisal from the seller 302 to an appraiser 308 and acceptance of the request by the inspector 306. State D is delivery of an inspection report to the buyer 304. State E is a transfer of consideration from the buyer 304 to the seller 302. State F is a completed sale of the asset. A new blockchain object may be created for each state, such as shown as blockchain objects 108 A-F, and each blockchain object may be stored on a new block, shown as blocks N-N6, of the blockchain 120. For example, the blockchain object 108A may be deployed by the seller 302 using the system 100. The blockchain object 108B may be generated as a result of the interaction between a message from the seller 302 and the blockchain object 108A and stored on block N2 of the blockchain 120. In addition to states A-F, the system 100 may track the states created, active, terminated, completed, inspected and appraised for the blockchain object as shown in FIG. 6 to track the intermediate states between the transitions A-F described in this Figure.

To interact with the blockchain object 108A, the buyer 304 may send an event (e.g., a message to the blockchain object 108 A addressed using a unique identifier of the blockchain 108 A) to the blockchain 120. A node in a peer-to-peer network of nodes mining the blockchain 120 to generate a consensus may receive the event, and process the event for generating new block N2 of the blockchain 120. In an example, the event (e.g., a blockchain object message) may be addressed to an address 301 (e.g., 0xBB9bc244D798123fDe783fCc1C72d3Bb8C189413) of the blockchain object 108A. The event may include the terms of the conditional acceptance of the buyer 304 to the seller 302. In an example, the node may execute the blockchain object 108A with the information in the event from the seller 302. The blockchain object 108A's code 109, when executed, may determine whether the event changes the state of the blockchain object 108A. The blockchain object 108A may then store any change in state such as acceptance of the offer on the blockchain 120. In an example, the node may store the acceptance of the offer or rejection of the offer on a new block of the blockchain 120, as shown by the blockchain object 108B stored on block N2, and use the blockchain object 108B to build a new block N2 and generate a consensus on the new block. The new block once generated is pushed to peers and is validated by the peers once they start working on the next block based on the new block pushed out by the node. Similarly, the blockchain objects 108C-F shown in FIG. 4A may be generated and placed on one or more blocks of the blockchain 120.

FIG. 4A is further described below with respect to the components of the system 100 shown in FIG. 3. In this example, assume the seller 302 creates the blockchain object 108A through the system 100. The system 100 may store contextual data (e.g., seller's profile) for the seller 302, which may be created when the seller 302 initially registers with the system 100 or is otherwise created when information for the contextual data (e.g., seller's profile) is collected by the system 100. To create the blockchain object 108A, the seller 302 may log into the system 100 with a username and password. From the login information, the identity service 192 may query the off-chain storage 110 to determine contextual data of the seller 302, such as the seller's role 172, persona 171, etc. In an example, the identity service 192 may obtain the contextual data of the seller (e.g., seller's profile) from the data repository 179 using the schema of the configuration file 198. The configuration file 198 may also associate the real-world identity of the seller 302 with a blockchain identity of the seller. The blockchain identity may be based on public key, private key cryptography. The off-chain identify of the seller 302 may be the role 172 and the persona 171 of the seller. For example, in a used car sales organization, the seller may be a manager. The manager may be allowed to create blockchain objects to sell cars and may have the authorization to perform certain actions. The configuration file 198 may describe the persona 171 allowed to interact and their actions in the form of the action list 178. The data repository 179 may store specific details such as identities of the persona 171 in the system 100, their first name and last name and the like based on the schema described in the configuration file 198. The blockchain identity of the seller 302 may be used to sign the blockchain object 108A.

The system 100 may present the seller 302 with a GUI in the user interface 142 to create the blockchain object 108A based on the contextual data of the seller 302 as described above with reference to FIG. 3. The GUI may allow the seller 302 to generate the blockchain object 108A for sale of the asset using the context schema 196. In an example, the system 100 generates the configuration file 198, as an instance of the context schema 196, during generation of the blockchain object 108A. The system 100 may determine the persona, role, actions, parameters and the like based on the contextual data. Through the GUI or multiple GUIs in the user interface 142, the system 100 may present the seller 302 with prompts to complete one or more parameters pertaining to the blockchain object 108A being created that may not be ascertainable from the contextual data. In an example, the system 100 may obtain the parameters for the sale of the asset such as the offer price, the terms of the offer, participants who may accept the offer, etc. The parameters for the sale of the assets may be stored in the data repository 179 based on the schematic information (e.g., type of each parameter) in the configuration file 198. The parameters for the sale of the assets may also be stored on the blockchain object 108A. The blockchain object 108A may be created based on the information stored in the data repository 179 and the contextual information in the configuration file 198. The signing service 148 may use the private key 184 (assuming the private key 184 and the public key 186 are for the seller 302) to sign the blockchain object 108A, and the blockchain service 188 may deploy the signed blockchain object 108A on the blockchain 120. In an example, the blockchain object 108A may store its current state in its internal memory. The blockchain object 108A may also be stored, along with its hash, in the off-chain storage 110. Also, the system 100 may initially set the state of the blockchain object 108A to state A. In an example the current state may be stored in the off-chain storage 110. The blockchain object 108A may include the parameters of the offer such as the offer price, terms of the offer, whether the offer is an open offer or is restricted to certain parties and the like, and this information along with the current state of the blockchain object 108 may also be stored in the data repository 179 using the contextual information available in the configuration file 198.

When the blockchain object 108A is created, the system 100 may also store in the data repository 179 the values of the state list 176 of the blockchain object 108A listing the current state. Additionally, the configuration file 198 may provide contextual information such as a previous state and the possible state transitions, and all possible states of the blockchain object 108, and the action list 178 lists the allowed actions of each persona in each state. The state list 176 may specify a sequence of state transitions that are allowed to occur and may also specify allowed transitions from a current state to a next state. For example, the blockchain object 108A in state A may transition to a defined list of states from its current state. The defined list of states may include acceptance of the offer, counter-offer, modification of the offer and withdrawal of the offer. The action list 178 may specify the personas who may interact with the blockchain object 108A and the actions available to a persona in each state of the blockchain object 108A. For example, the action list 178 may specify that when the blockchain object 108A is in state A, a participant that has the persona of a buyer is allowed to interact with the blockchain object 108A and can interact with the blockchain object 108A to make an offer. The transition diagram shown in the Figure shows a couple of different transitions mapped in the state list 176 such as state A, state B and state F (shown as 310, 312) as one possible set of states. In another example, the blockchain 108 may transition from state A through state F (shown as 310, 312, 314, 316 and 318).

The system 100 may access the configuration file 198 to obtain context information about the blockchain object 108A. Also, the blockchain object 108A along with the data repository 179 may be accessed in the off-chain storage 110 to determine the current state of the blockchain object 108A. In an example, the system 100 may authenticate the identity of the seller 302 using the identity service 192. The system 100 may allow the seller 302 to interact with the blockchain object 108A to change its state. For example, the system 100 may provide a user interface 142 for the seller 302, generated using the contextual information in the configuration file 198 and the data repository 179. For example, the user interface may allow the seller 302 to modify the parameters of the offer such as the offer price.

After being deployed, the blockchain object 108A may receive events (e.g., messages generated by the system 100) pertaining to interactions from the seller 302 and other allowed personas, such as the buyer 304, based on the current state (e.g., state A) of the blockchain object 108A. In an example, the blockchain object 108A may ignore messages from the inspector 306 or the appraiser 308 because the state of the blockchain object 108A does not allow a persona such as an appraiser 308 or the inspector 306 to alter the state or provide any inputs. For example, the code 109 executed by the blockchain object 108A determines to ignore those messages based on comparison to approved personas and state transitions from the current state that are derived from the action list and other information. Also, the system 100 may prevent such messages from being addressed to the blockchain object 108A if the appraiser 308 or the inspector 306 are attempting to interact with the blockchain object 108 through the system 100, when the blockchain object 108A is in state A. Similarly, the actions available to a persona such as a buyer 304 is also prescribed by the machine-readable instructions in the blockchain object 108A.

Assume the current state of the deployed blockchain object 108A is state A and the buyer 304 logs into the system 100. The system 100 may authenticate the buyer 304 through the identity service 192. The system 100 may determine based on the participant contextual data stored in the off-chain storage 110 the persona of the buyer 304. The system 100 may allow the buyer 304 to interact with the blockchain object 108A to purchase the asset. This action of the buyer 304 is one of the acceptable actions in the action list 178 based on the current state. For example, the system 100 may present a user interface to the buyer 304 to receive the parameters of the conditional acceptance or counter-offer. The system 100 may use the configuration file 198 to determine the parameters for the blockchain object 108A that may change the state (e.g., acceptance of a conditional offer). The system 100 may determine the address 301 of the blockchain object (e.g., 0xBB9bc244D798123fDe783fCc1C72d3Bb8C189413) to send the message. For example, the system 100 may obtain the event (e.g., the blockchain object 108A) through the blockchain monitor 122 or from off-chain storage 110. The system 100 may then deploy an event (e.g., a message addressed to the address 301) to the blockchain object 108A through the blockchain service 188. The system 100 may use the private key 184 and public key 186 from the memory 103 and the identity service 192 to authenticate the participant (e.g., the buyer 304) on the blockchain 120, sign the message to the blockchain object 108A, and the like. The system 100 may use the hashing service 144 to hash the message for storage in the off-chain storage 110. In an example, the message may be a blockchain object. The system 100 may store the hash of the message and the message in the off-chain storage 110. The system 100 may deploy the message as an event on the blockchain 120 and include the address of the blockchain object 108A to send the event (e.g., the message to the blockchain object 108) to the blockchain object 108A. In an example, the event (e.g., a message to the blockchain object 108A) may be a data object and may not include code.

In an example, the system 100 may track the blockchain object 108A when the buyer 304 conditionally accepts the offer to purchase the asset subject to an inspection and/or an appraisal. The blockchain object 108A, once it receives the message, may be executed by a node in a peer-to-peer network of nodes mining the blockchain 120 to arrive at a consensus. The node may execute the code 109 in the blockchain object 108A. The blockchain object 108A may change state from state A to state B. The blockchain object 108B may be deployed to the blockchain 120 in a new block and published to peers on the peer-to-peer network by the node. The blockchain object 108B may then send a message to the seller 302. In an example, the code 109 may not include a state for conditional acceptance but may have an exception handling capability. The system 100 may receive the message from the blockchain object 108B through the blockchain monitor 122. For example, the blockchain monitor 122 may retrieve new blocks on the blockchain 120 to identify messages that may be sent to a participant. In an example, a participant on the blockchain 120 may be allocated a blockchain address. In another example, the blockchain monitor 122 may identify messages from the blockchain object 108B based on the signature of the blockchain object 108B or the signature in the event (e.g., message or object). The system 100 may then alert the seller 302 when the seller logs into the system 100 and the seller is detected through their username and password. The system 100 may receive parameters to address the exception through the user interface 142. The system 100 may then deploy an event (e.g., a message to the blockchain 120 addressed to the blockchain object 108B). The blockchain object 108B may change state to state C based on the event. The blockchain object 108B may then be deployed as blockchain object 108C on a new block of the blockchain 120. At state C, the system 100 may allow the seller 302 to interact with the blockchain object 108C and make an offer to an inspector 306 and/or an appraiser 308. The system 100 may transmit the offer to the blockchain object 108C as an event (e.g., a message using the blockchain service 188). The blockchain object 108C, once it receives the message, may wait for acceptance of the offer by an inspector 306 or appraiser 308. The appraiser 308 and/or inspector 306 may be required to provide the report to the buyer 304. In an example, the appraiser 308 and/or inspector 306 may provide the report to the blockchain object 108C as a message and the blockchain object 108C may then transition to state E. In another example, the system 100 may track actions of the appraiser 308 and/or inspector 306 and send a message to the blockchain object 108 through the blockchain 120 changing the state of the blockchain object 108D to state E. The blockchain object 108E may then be deployed on a new block of the blockchain 120. The system 100 may obtain the block updates to the blockchain 120 periodically through the blockchain monitor 122. The blockchain monitor 122 may place the events (e.g., the appraisal and/or inspection completion) on the event stack 104. In an example, the event may be processed by the storage service 143 and stored on the off-chain storage 110.

The buyer 304 may use the user interface 142 to send an event to the blockchain 120 with the consideration. For example, the buyer 304 may attach proof of the event through banking channels. In another example, the buyer 304 may use a cryptocurrency to perform the transaction. In another example, banks may provide confirmation hashes that may be deployed on the blockchain that may be secured using the public key of the blockchain object 108E and may be verified by the blockchain object 108E.

In an example, the system 100 may periodically update the blockchain 120 with details such as confirmation of a financial event such as transfer of money. The system 100 may receive the financial event confirmation from the other systems 107. The input service 115 may process the event and place the event on the event stack 104 for deployment to the blockchain 120 through the blockchain service 188. In an example, the system 100 may use the hashing service 144 and/or the signing service 148 to securely encrypt the confirmation message with the public key of the blockchain object 108 to confirm receipt of consideration. The system 100 may thus generate, deploy and manage the blockchain object 108 on the blockchain 120.

Figure 4B:
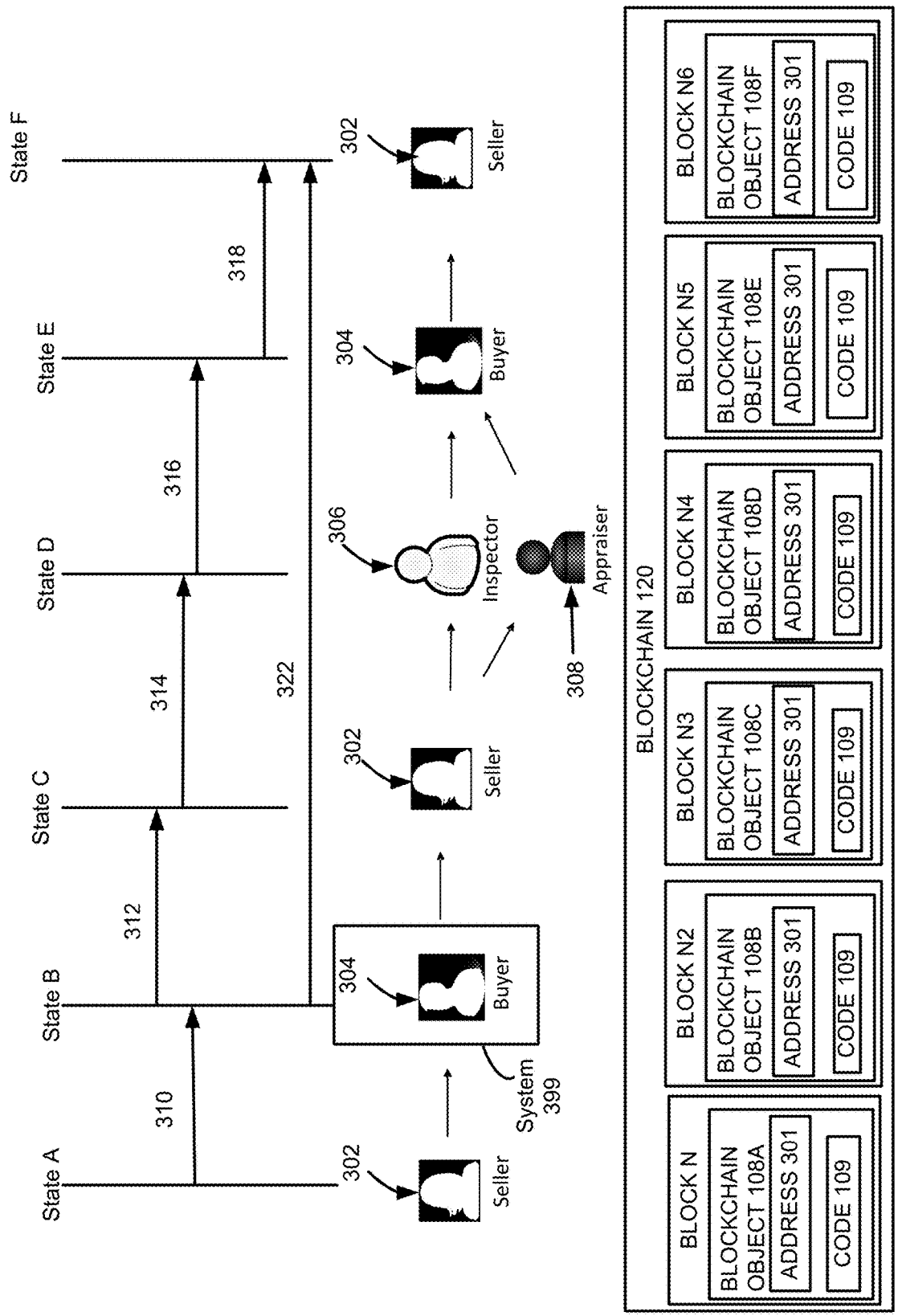

FIG. 4B shows an example of states of the blockchain object 108 tracked by the system 100 where one or more participants may be using a system other than system 100. Assume for FIG. 4B that the buyer 304 does not use the system 100 to interact with the blockchain object 108. The buyer 304 may instead use system 399 or perform several manual operations to interact with the blockchain object 108.

For example, after the seller 302 deploys the blockchain object 108A via the system 100, the buyer 304 may, through the system 399, send a conditional offer to the seller 302, causing the blockchain object 108B to be created in block N2. The system 100 may use the blockchain monitor 122 to obtain the block update with the block N2 which may include the conditional offer. The input service 115 may identify the blockchain objects in the block update, and place events in the event stack 104. The system 100 may determine the blockchain objects that correspond to the seller 302. For example, the system 100 may determine the address of the blockchain object 108A or 108B and use the address to identify the event including the conditional offer. The system 100 may then determine whether the message changes the state of the blockchain object and updates the state if needed in the off-chain storage 110, where it maintains a copy of the current state of the blockchain object. In an example, the system 100 may send a notification to the seller 302 after processing the block n2. The notification may include information about the blockchain object 108B, like the description of the asset, the price of the counter-offer, the actions available to the seller 302 and the like. The system 100 may then receive an action from the seller 302 and deploy the response to the blockchain 120 as a message addressed to the blockchain object 108B.

Also, the system 100 may serve as an interface between events at the event stack 104 by deploying messages addressed to a blockchain object on the blockchain 120. Also, a blockchain object may address messages to the event stack 104 by deploying a blockchain object that addresses another blockchain object that identifies a participant. The blockchain monitor 122 may then retrieve the blockchain object and determine the request type. The request from the blockchain object may be a request to authenticate a participant in the system with a public key of the participant.

In an example, the buyer 304 may not be known to the system 100. The blockchain object 108A may request an authentication when the buyer 304 sends a message addressed to the blockchain object 108A. Assume the buyer 304 is not an authorized participant with a trusted public, private key pair. The system 100 may authenticate the buyer 304 using means such as an off-chain identification process with a background check and the like. The system 100 may then respond to the parameter request with the authentication for the buyer 304. In another example, the parameter request may be related to an exception triggered by a message or an unexpected change in parameters. The system 100 may thus provide a two way interface between the blockchain object 108 and the events on the event stack 104.

In another example, the buyer 304 may not be a participant with a login associated with the system 100 as described above with reference to FIG. 1. The system 100 may receive the responses from the buyer 304 as an event from other systems 107 as discussed above with reference to FIG. 1. For example, the buyer 304 may send an email, and the system 100 may determine whether the buyer is of a persona allowed to interact with the blockchain object in its current state. The input service 115 may process the email and convert the offer from the email to a message addressed to the blockchain object.

FIG. 5 shows an example of the context schema 196. For example, the context schema 196 includes properties 402 of a blockchain object 108. The properties 402 of the context schema 196 may correspond to the details of the configuration file 198 of the blockchain object 108. In an example, the configuration file 198 may include the state list 176 that may correspond to the states 404 in the context schema 196. Similarly, the action list 178 may correspond to the parameters 406, the persona 171 may correspond to the persona 410, the blockchain id 174 that corresponds to the blockchain identifier 414, the parameter 175 that corresponds to the parameters 406 and the user interface 173 that corresponds to the user interface 412 of the configuration file 198 and the context schema 196 respectively.

For example, the blockchain identifier 414 may identify the blockchain where the object is deployed, and the like. The system 100 may use the context schema 196 to generate the configuration file 198, which is an instance of the context schema 196 populated with types of the values for a particular blockchain object, such as the blockchain object 108 and the values of the particular blockchain object may be stored in the data repository 179. In an example, the system 100 may generate a configuration file for each blockchain object that is deployed, managed and/or tracked.

In an example, the system 100 may use the context schema 196 to generate the configuration file 198 during deployment of the blockchain object 108. In another example, the system 100 may generate a configuration file for a blockchain object deployed on the blockchain 120 by a third party. The system 100 may identify blockchain objects that were deployed by another system and pertain to a particular participant or another blockchain object being monitored by the system 100. The system 100 may then generate a configuration file describing the possible states of the blockchain object, the state transitions, and the actions of personas in specific states.

The configuration file 198 described below with reference to FIG. 6 may also include a state list of possible states of the blockchain object 108 and may serve as a map to describe the past, present and future states of the blockchain object 108. The system 100 may retrieve the current state of the blockchain object 108 from the data repository 179 using the configuration file 198 as a map and for providing additional context. The configuration file 198 may map possible states of the blockchain object 108 to one or more participants, roles of participants, history of the other blockchain objects on the blockchain and the like. For example, the system 100 may use the configuration file 198 with the data repository 179 to determine the current state of the blockchain object 108, the actions available for the personas and the parameters of the actions, and possible states of the blockchain object 108 based on a current state for particular participants.

The configuration file 198 (descried below with reference to FIG. 6 below) or the context schema 196, may be used to generate GUIs in the user interface 142. For example, the configuration file 198 may be used to populate a GUI using the user interface generator 140 to display contextually accurate user interface from the UI list 173 to display event information for a blockchain object 108 from the data repository 179. The GUIs generated based on the UI list 173 provide a mechanism for a participant to interact with the blockchain object 108. The system 100 may display a GUI in the user interface 142 for the participant to view contextual information about the blockchain object 108 such as the parameters, the state, and personas that may interact with the blockchain object. For example, the system 100 may display a list of blockchain objects that are associated with the seller 302 shown in FIG. 4A. The system 100 may similarly provide a list of blockchain objects that list an asset for sale irrespective of the identity of the seller. For example, the system 100 may determine a list of real estate sale offers on the blockchain 120 matching a search specification.

The system 100 may also use the configuration file 198 or the context schema 196 to provide context for other services. In an example, analytics services 132 may utilize the blockchain data stored in the off-chain storage 110 (e.g., the data repository 179) and the configuration file 198 for data modeling. The configuration file 198 provides context to the blockchain data. The blockchain data without the configuration file 198 may be a chronological list of events stored with other additions to provide immutable verification of the events. The blocks in the blockchain may contain random events grouped together based on time of arrival of the blockchain objects. In an example, a block in the blockchain may be populated with disparate events such as blockchain object deployments, a status change of a blockchain object 108 (in FIG. 3), a message to another blockchain object on the blockchain, transfer of cryptocurrency between two participants, and the like. Subsequent updates to events on the blockchain such as updates to the state of a blockchain object 108 (in FIG. 3) are populated in the next available block of the blockchain with other events that arrive close to each other. Thus, the blocks in the blockchain contain random events. The system 100 may provide access to the blockchain object 108 with the contextual information from the configuration file 198. The configuration file 198 may thus be used as an index that allows retrieval of events that are otherwise distributed randomly in the blockchain 120.

For example, the analytics service 132 may use the configuration file 198 and events in the off-chain storage 110 (e.g., the data repository 179) to transform the events in a blockchain for modeling. The analytics service 132 may retrieve the events from the off-chain storage 110 similar to the how the service handles other data for analytics. For example, the analytics service 132 may use the data repository 179 (e.g., SQL database) to store and retrieve events (e.g., transactions on the blockchain 120) from the blockchain 120. The analytics service 132 may also use the configuration file 198 to retrieve events for predictive model building and optimization. The configuration file 198 can provide a hierarchical relationship linking a blockchain object 108 on the blockchain 120 to entities that have interacted with the blockchain object 108, possible entities who may interact with the blockchain object 108, possible interactions with the blockchain object 108, relationships between events on the blockchain, state of the blockchain object 108, past states of the blockchain object 108 and possible future states of the blockchain object 108. For example, the configuration file 198 can provide a hierarchical index for an event on the blockchain, linking the event with entities in the real world, the interactions of the participant in other related events, constraints on the real world participant in future related events, entities that may interact with the event in the future and their degrees of freedom in the interaction and the like. This index can be used to retrieve relevant information for analytics.

In an example, the off-chain storage 110 includes the data repository 179 to store values of parameters described in the configuration file 198. The analytics service 132 retrieves events from the data repository 179 for model building, and groups the events according to persona, role or the like. The analytics service 132 may also combine the events in the off-chain storage 110 with other sets of data such as profile data of consumers for model building.

In an example, the system 100 may use the analytics service 132 to identify products or services a customer is interested in based on the events stored on the blockchain 120. The system 100 may then combine this information with the browsing history of the customer. Thus, the system 100 may provide services to allow businesses to track their customer base better, identify potential customers and allow targeted advertising to potential customers.

In an example, the off-chain storage 110 may organize events using the configuration file 198 before storing them in the off-chain storage 110. For example, the off-chain storage 110 may store events related to the same persona under the same classification. The off-chain storage 110 may store related data together instead of chronologically. The analytics service 132 may use the context to transform and model the data.

The system may use the context schema 196 to determine the constraints on the blockchain object. For example, the context schema may specify who, when, where, what, why and how for interactions with the blockchain object. In an example, the system may store a configuration file 198, an instance of the context schema 196 for each blockchain object. The system may use the context schema 196 to determine the persona type who may act on the blockchain object. In an example, the context schema 196 may describe a hierarchy of blockchain object, state, action, persona, role and other contextual information along with the history of the event. The system may use an instance of the context schema, i.e., a configuration file for each blockchain object.

FIG. 6 shows an example of the blockchain object 108 and an example of the corresponding configuration file 198. In an example, the system 100 may create the configuration file 198 as an instance of the context schema 196 during deployment, based on the inputs received from the user through the user interface 142.

The configuration file 198 may describe the personas of the blockchain object 108 present in the code 109 shown on the left-hand side of the FIG. 6. In an example, in the blockchain object 108 the personas the seller 302, the buyer 304, the inspector 306 and the appraiser 308 are defined in the code 109. Similarly, in the configuration file 198 the types of the personas the seller 302, the buyer 304, the inspector 306 and the appraiser 308 are described as "user".

Also the blockchain object 108 shows a state of the blockchain object 602 in the code. Similarly, the configuration file 198 provides a a map of the states. As described above with reference to FIG. 4A and FIG. 4B, the blockchain object 108 may transition between six different states before the conclusion of the sale of the asset. The configuration file 198 may provide the list of all transitions possible until the conclusion of the sale of the asset.

The configuration file 198 may have the state list 176 including the possible states for the transfer of an asset shown in FIG. 4A. The state list 176 includes a mapping such as all possible states from state A through state F. As described above with reference to FIG. 4A, state A depicts an offer for sale of the asset from seller 302 to buyer 304. State B is a conditional acceptance subject to inspection, from the buyer 304 to the seller 302. State C is a request for inspection from the seller 302 to an inspector 306 or a request for appraisal from the seller 302 to an appraiser 308 and acceptance of the request by the inspector 306. State D is delivery of an inspection report to the buyer 304. State E is a transfer of consideration from the buyer 304 to the seller 302. State F is a completed sale of the asset. In addition to the states A to F described above, the blockchain object may include additional states such as created, active, terminated, completed, inspected and appraised as shown in state mapping 610.

Similarly, the configuration file includes the parameters for each of the actions of personas in each of the states. For example, in the state created and active, the parameter may be an asking price 606 of type "money". In an example, the persona initiating the blockchain object 108 may be the seller 302 as described above with reference to FIG. 4A and FIG. 4B. The persona seller 302, may during the state created and active be required to provide the parameter asking price 606. In an example, the asking price 606 may be in United States Dollars (USD), in a cryptocurrency (e.g., Bitcoin™) or the like. The system 100 may receive the information and store the information in the data repository 179 as described above with reference to FIG. 1. The blockchain object 108 may be initialized with the asking price 606. The system 100 may also store the initial state of the blockchain object 108 using the state 602. The system 100 may after initializing the state change the state from created to active.

Other examples of the parameters may include an offer price 606, in the state counter-offer from buyer 304 to seller 302. The type of the offer price 608 may be money. In an example, the buyer 304 may send a message (e.g., a blockchain object with the offer price 606 addressed to the blockchain object 108) and deploy the message to the blockchain 120. The personas that may interact with the deployed blockchain object may include the seller 302, the buyer 304, the inspector 306 and the appraiser 308. The offer from the persona buyer 304 may include an offer price 608 with the type money.

In an example, one or more of the entities, such as the buyer 304, the inspector 306 and/or the appraiser 308, may interact with the blockchain object 108 and the blockchain 120 directly without using the system 100. The blockchain monitor 122 may determine the changes in the blockchain update or new blocks of the blockchain 120 to determine whether the blockchain object 108 has changed state or if there is a second blockchain object that addresses the blockchain object 108 in the new block of the blockchain 120. The configuration file 198 may allow the participant to identify the types of each of the parameters such as the action list 178 (not shown in FIG. 6, but shown in FIG. 1), the state list 176 and the like and obtain contextual information. In an example, the initial values and the intermediate values of the blockchain object 108 may be stored in the data repository 179 (shown in FIG. 1).

Figure 7:
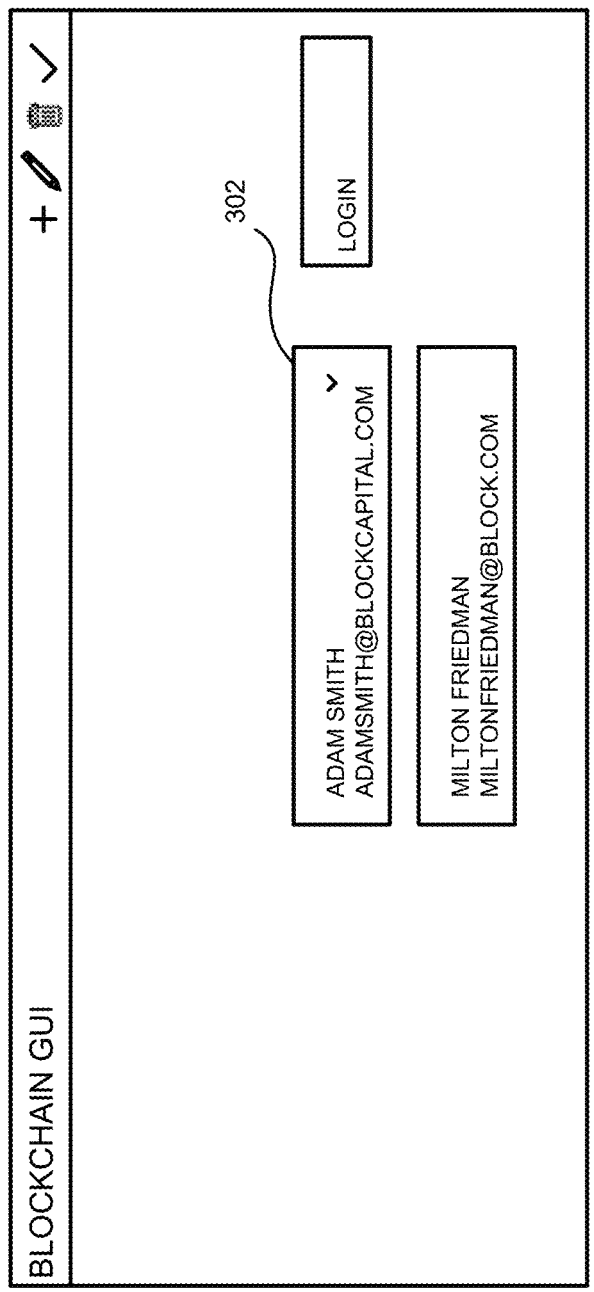
Figure 8:
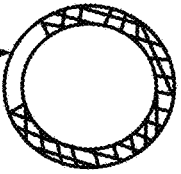

FIGS. 7-9 show examples of GUIs that may be generated by the user interface generator 140 in the user interface 142. FIG. 7 shows a login screen presented to a participant who is not logged in. A participant may log in to the system 100 with a username and password as discussed above. The system 100 may associate the username and password of the participant as described above with the contextual information stored in data repository 179 using the information in the configuration file 198. The identity service 192 may identify the participant's off-chain identity and the participant's blockchain identity. In an example, the participant's off-chain identity may be the private key 184 and the public key 186 of the participant. In another example, the identity service 192 may during the creation of a username receive the private key 184, public key 186, the role 172 and the persona 171 of the participant. The system 100 may use this contextual information to display the appropriate user interface once the participant is authenticated by the system 100. In an example, the use of a single sign in that links the off-chain identity of the participant and the blockchain identity of the participant permit authentication of the participant and revocation of the participant's credentials on both the blockchain and the system 100. This may prevent misuse of the public key 186 and/or the private key 184 once the participant no longer has appropriate access credentials or the credentials are revoked. For example, a manager in a car sales dealership may retire, and the credentials may be revoked after retirement.

A GUI shown in FIG. 8 may display actions 778 for a participant after the participant logs in. Also, the system 100 may display the participants interacting with the blockchain object 108. For example, the participants 771 interacting with the blockchain object for sale of an asset are the seller 302 (e.g., owner of the car), the buyer 304 of the car, the inspector 306 of the car and the appraiser 398 of the car as discussed above with reference to FIG. 4A. This information may be determined based on information in the configuration file 198. The system 100 may use the identity service 192 to identify the off-chain identity of the seller 302. For example, as discussed above with reference to FIG. 3, the system 100 may use the credential of the seller such as the email address, mac address and/or unique identifier of the seller 302 with the off-chain identity such as name and image of the seller 302. In another example, assume the buyer 304 is not using the system 100. The system 100 may obtain the public key when the buyer 304 makes an offer through a second blockchain object addressed to the blockchain object 108. The system 100 may then retrieve the name associated with the cryptographic signature used on the second blockchain object. For example, the public key may be stored in a trusted key database on a network such as the internet. In an example, the system 100 may retrieve the first name and last name of the seller 302, store the information in the data repository 179 on the off-chain storage 110. The system 100 may similarly include the information for the inspector and the appraiser. As shown in FIG. 8, the images of the buyer, inspector and the appraiser may not be available because they may not be using the system 100 and the image may not be available in a public repository.

In an example, the user interface generator 140 may request the current state of the blockchain object 108. The blockchain oracle 146 may retrieve the information from the off-chain storage 110 based on the context schema 196 or the configuration file 198. The user interface generator 140 may then present the participant with the state information 712 as shown. The user interface generator 140 may also generate the list of actions 778 available such as reject, terminate and accept the offer as shown, that correspond to the action list 178 in the configuration file 198 for the current state 712. The system 100 may also present the participant (e.g., seller 302) with information or description 702 of the asset. The system 100 may generate this information based on the contextual information provided by the context schema 196.

Figure 9A:
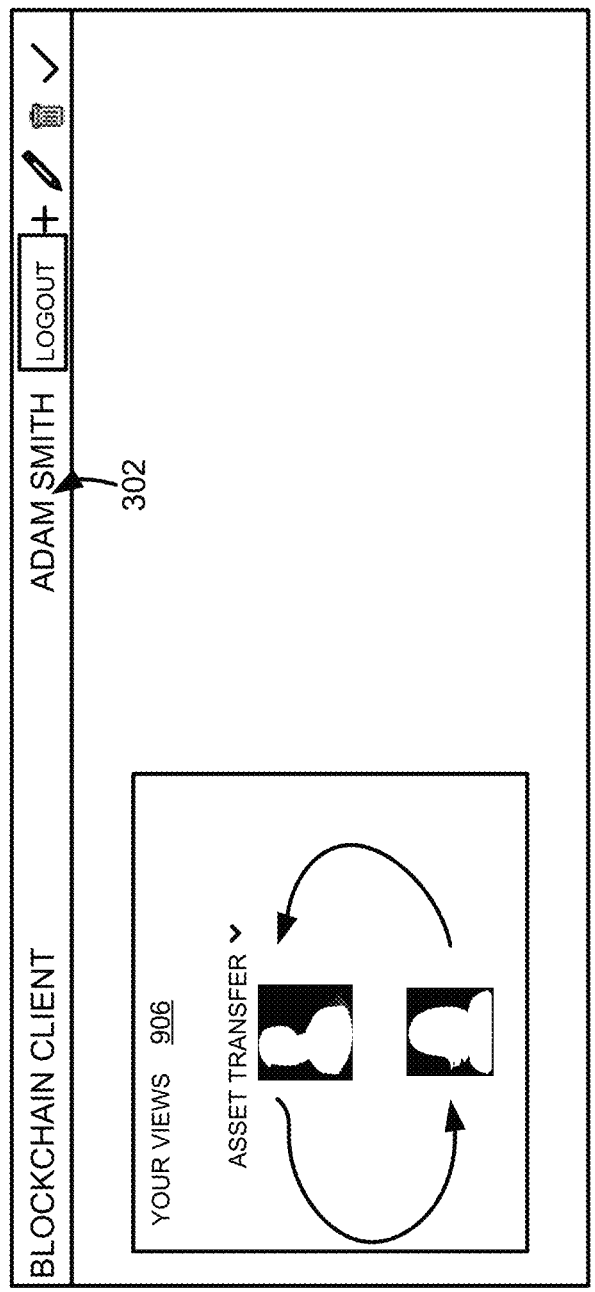

The system 100 may generate the user interface 142 shown in FIGS. 9A-B based on one or more blockchain objects. FIG. 9A shows a GUI of participants that are interacting or that may interact with the blockchain object 108. FIG. 9B shows a GUI displaying all the asset transfers by an entity such as a car dealership. In an example, assume participants using the system 100 may be employees of a car dealership. The system 100 may generate a comprehensive view of the state of each blockchain object the employees are interacting with, the state of the blockchain object, description of the blockchain object, the asking price of an asset, the offer price if any, the buyer of the asset and the like on a single screen. The user interface shown in FIG. 9B may, for example, be triggered by using the interface shown in FIG. 9A. The system 100 may determine the details of the blockchain objects deployed on the blockchain 120 from the off-chain storage 110 and the configuration file 198. A notifications interface 902 may retrieve events from the event stack 104 to show events received from the blockchain monitor 122 for objects in the assets list 904.

Methods according to embodiments of the present disclosure are described below. The methods are described as being performed by the system 100, such as the system 100 shown in FIG. 3, but the methods may be performed by other systems. The methods and operations described herein may be performed by one or more servers or other types of computers including at least one processor executing machine-readable instructions stored on a non-transitory computer readable medium. Also, one or more of the steps of the methods may be performed in a different order than shown or substantially simultaneously.

Figure 10:
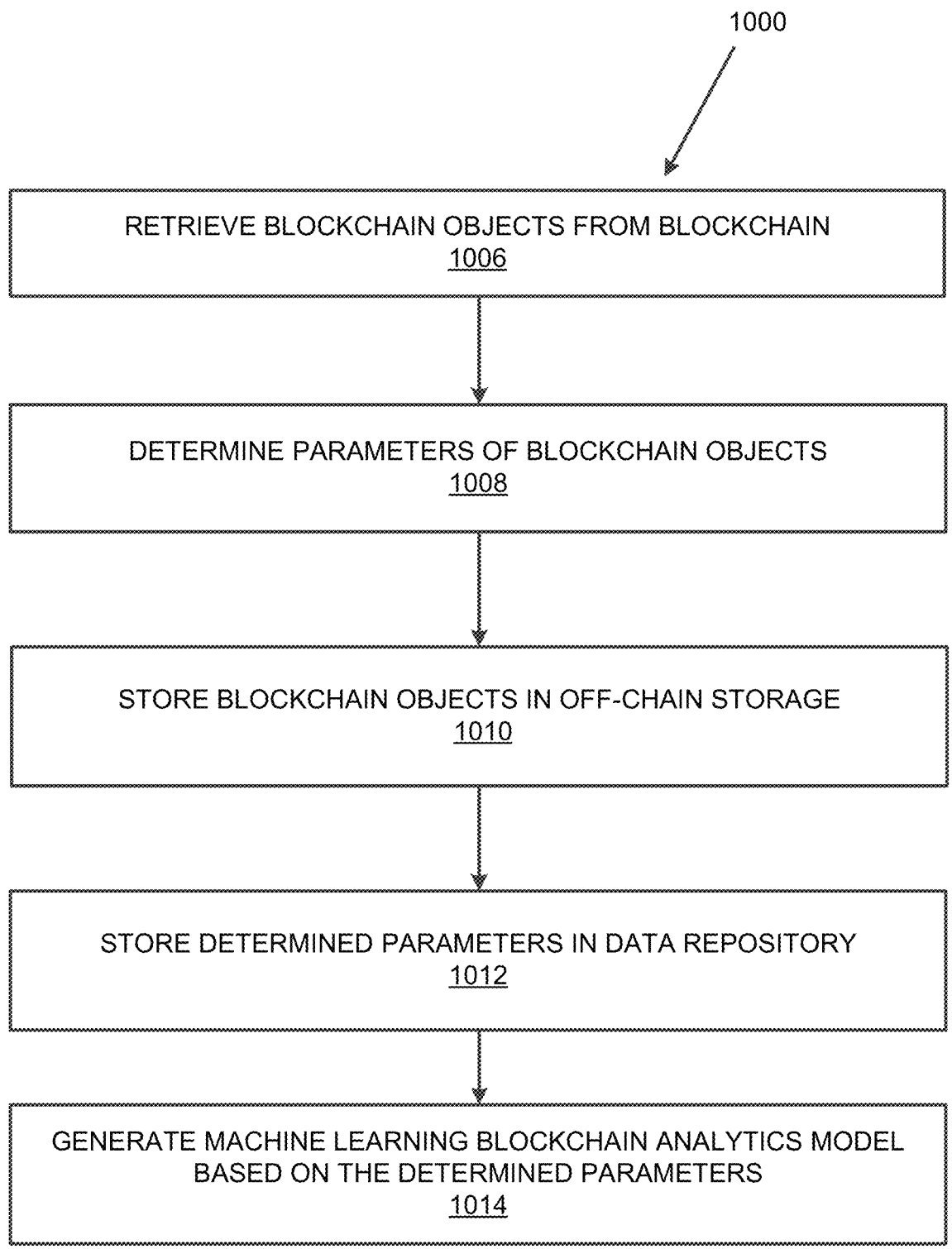
FIGS. 10-13 show examples of methods, according to embodiments of the present disclosure.

FIG. 10 shows an example of a method 1000 for blockchain analytics. At block 1006, the system 100 may retrieve objects from the blockchain 120. In an example, the system 100 may retrieve blockchain objects from the genesis block to the current block. For example, the blockchain may include thousands of objects. The system 100 may retrieve the objects on the blockchain 120 from the genesis block to the current block and store the events (e.g., the blockchain object) on the event stack 104 in the order in which they appear on the blockchain 120.

At block 1008, the system 100 may determine parameters of blockchain objects on the event stack 104. In an example, a blockchain object on the event stack 104 may be a smart contract. The system 100 may determine the states of the smart contract, the participants who interacted with the smart contract, the machine-readable instructions expressing the constraints of interaction between the participants, the role of the participants and the like. In an example, the system 100 may use the context schema 196 to determine the parameters of the blockchain object.

Optionally, at block 1010 the system 100 may store the blockchain objects on the off-chain storage 110. In an example, the system 100 may store blockchain objects from the blockchain 120 in the off-chain storage 110. In an example, the system 100 may store a hash of the blockchain object to verify the integrity of the blockchain object on the off-chain storage 110.

At block 1012, the system 100 may store the determined blockchain objects parameters in the data repository 179. For example, the system 100 may include the state of smart contracts on the blockchain in the data repository 179. The system 100 may also include in the data repository 179 parameters such as the blockchain identity of the participant who deployed the blockchain object, the blockchain identity of the participant who interacted with the blockchain object and the like. In an example, the system 100 may use the context schema 196 to determine the parameters of the blockchain objects retrieved from the blockchain.

At block 1014, the system 100 may generate a machine learning blockchain analytics model based on the determined parameters. For example, the system 100 may include a machine learning service. Examples of machine learning services may include supervised and unsupervised machine learning algorithms. In an example, the system 100 may include a service such as the Azure™ Machine Learning algorithms for supervised or unsupervised learning. For example, the machine learning service may be a classifier. In an example, a classifier may be a multi-class classifier, binary classifier or a unary classifier (e.g., an anomaly detector). In another example, the system 100 may use a neural network for binary classifications. In another example, the system 100 may use a neural network to detect unary classifications of blockchain objects that belong to a class or those that do not belong to a class.

In an example, the system 100 may determine blockchain objects on the blockchain 120 that were deployed by a particular participant. For example, the system 100 may determine smart contracts that were deployed to sell assets by a manager. The system 100 may use the blockchain identity of the manager to determine the smart contracts associated with that identity in the data repository 179.

In an example, the system 100 may generate a visualization based on determined parameters. For example, the system 100 may generate a visualization of the smart contracts that are deployed to sell assets by a manager. The system 100 may also include details of the participants who interacted with the manager and the like.

In an example, the system 100 may determine the performance of a manager selling assets for an entity. In another example, the system 100 may determine the blockchain objects that may be of interest to an entity. For example, assume the entity is a car dealership. The system 100 may allow the car dealership to obtain analytical information on the cars that are available in the market, the closing rates for the cars that are listed on the blockchain 120, the trend indicating demand for a specific make or model of a car and the like.

In an example, the system 100 may use a service such a deep learning neural network to analyze the information in the data repository 179. For example, the system 100 may analyze the current trend in blockchain objects that are of a specific type. For example, the current trend in the blockchain 120 may be an offer for sale of a specific car model. The system 100 may place an event on the event stack 104 based on the current trend. For example, the sales manager at a car dealership may receive an alert about the current demand for the specific car model. In another example, the system 100 may use the deep learning neural network to analyze the optimal parameters in blockchain objects. For example, the deep learning neural network may be trained on the blockchain data to determine the mileage, the condition, the color and the like of the cars that are of interest to participants with the role of a buyer. Although described with reference to the deep learning neural network other machine learning methods may be used for analytics.

In an example, the system 100 may use the information on the blockchain 120 to determine the off-chain identity of a participant. For example, the vehicle numbers of cars may be associated with their owners using the VIN number database. The system 100 may thus build a profile of an individual that combines the blockchain identity of the participant with the off-chain identity of the participant. In another example, the system 100 may use the time blockchain objects were deployed or the time of interaction with the blockchain object to infer certain details such as the experience of a manager in a specific type of transactions and the like.

In an example, the system 100 may receive a block update from the blockchain 120. The block update may include a plurality of blockchain objects. In an example, the system 100 may use the off-chain storage 110 with the blockchain objects on the blockchain 120 to create machine learning models. For example, the system 100 may use the blockchain objects to determine whether an event in the blockchain 120 is likely to be fraudulent based on a fraud machine learning model constructed from the blockchain objects in the blockchain 120. In an example, the system 100 may determine an anomaly in a block update. For example, the anomaly in the block update may be a deviation of the parameters of blockchain objects in a block update when compared with the fraud machine learning model. The system 100 may generate an event to alert a participant on the event stack 104 based on the anomaly detected.

In another example, the system 100 may generate a blockchain analytics model that combines the data from the blockchain with the data from the real world about a participant to maximize the transactional value. In an example, the blockchain analytics model may be trained on the events from the blockchain 120 received at the event stack 104. For example, assume a participant in the blockchain 120 is interested in buying a car. The system 100 may use a blockchain analytics model that combines the real-world information about the participant with the information from the blockchain for the participant to maximize the sale price of the car. For example, the system 100 may have a profile that includes a history of the previous purchases made by the participant. The system 100 may then use the history in the blockchain analytics model to determine the specifications of a car that may interest the participant based on the history and the blockchain analytics model.

In another example, the system 100 may use the analytics data to generate a message to the blockchain 120. For example, the system 100 may monitor the events on the blockchain 120 in a block update. In an example, the system 100 may determine based on the blockchain objects in the block update that an anomaly exists in a process. For example, assume the blockchain 120 is used by a consortium that deals with sustainable fishing. The blockchain 120 may be used to track fish from the moment the fish is caught to the supermarket shelf. The system 100 may receive periodic messages from sensors during transportation of the fish. In an example, the system 100 may receive a notification that one batch of the fish was exposed to temperatures that make the fish unsafe for consumption. The system 100 may sent a message to the blockchain 120 or another blockchain to indicate the fish is unsafe for consumption.

In another example, the system 100 may identify a pattern in a blockchain update, based on the machine learning blockchain analytics model. For example, the system 100 may use a service such as a classifier to determine patterns in blockchain objects on the blockchain. For example, the system 100 may track supermarket sales information for fish to determine whether demand for fish is strong. The system 100 may then deploy a blockchain object to the blockchain 120 based on the analytics. For example, based on a determination that the demand for fish is strong, the system 100 may generate a message blockchain object based on the identified pattern (e.g., demand for fish in the supermarket). In an example, the system 100 may generate a smart contract for the purchase of the fish. The system 100 may deploy the blockchain object (e.g., a smart contract) for the purchase of fish.

In another example, the system 100 may track the weather information. The system 100 may determine whether that the weather patterns indicate that hubs in a logistics system may be out of commission. The system 100 may deploy a blockchain object to the blockchain 120 to procure and/or stockpile a commodity. For example, batteries, generators may be in demand during hurricanes or snow storms. The system 100 may thus deploy events (e.g., messages) to the blockchain 120.

In another example, the system 100 may deploy a message to another blockchain in response to an anomaly. For example, assume the system 100 determines based on a blockchain analytics model that the defaults on car leases is higher than average. The system 100 may deploy a message to a private blockchain used by lease underwriters to indicate higher than average incidence of defaults on car leases. In an example, the system 100 may alert a participant based on the blockchain analytics model when a pattern is identified in the blockchain. For example, the machine learning blockchain analytics model may be used to identify a pattern such a demand for an asset. The system 100 may alert a participant through the user interface.

Figure 11:
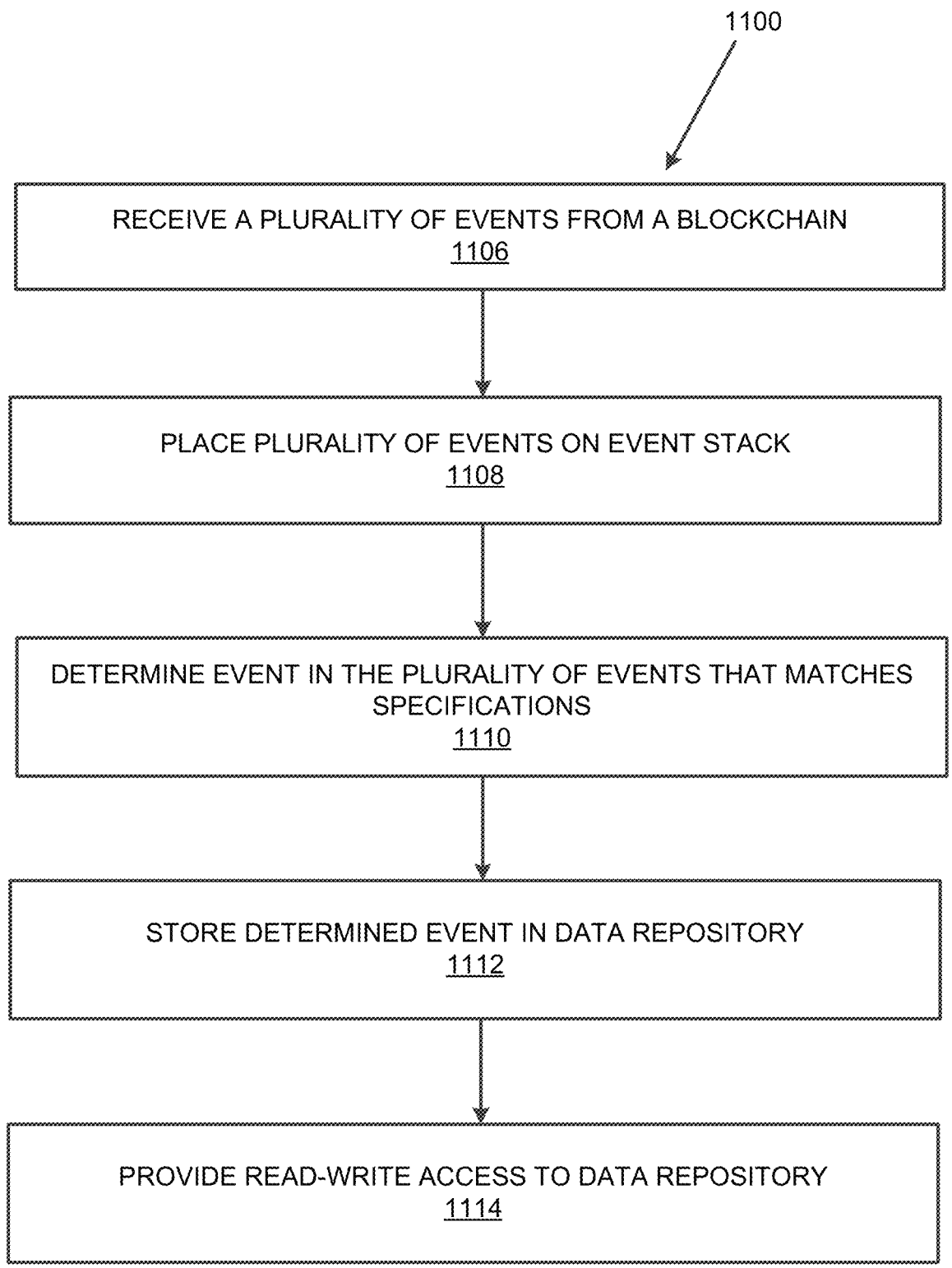

FIG. 11 shows an example of a method 1100 for blockchain analytics system using an event stack 104 shown in FIG. 3. In an example, the system 100 may allow analytics services to access information on the blockchain 120 such as the blockchain object 108. At block 1106, the system 100 may receive a plurality of events from a blockchain 120. In an example, as discussed above with reference to FIG. 3, the blockchain monitor may receive the plurality of events from the blockchain 120. For example, the plurality of events may include blockchain objects such as the blockchain object 108 and changes to blockchain objects placed on the blockchain. The blockchain objects on the blockchain may be received from a block update. A block update may be the newest block on the blockchain 120.

At block 1108, the system 100 may place the plurality of blockchain objects on the event stack 104 may temporarily store the plurality of events from the block update to allow other services in the system 100 to access the events.

At block 1110, the system 100 may optionally determine an event in the plurality of events that matches the specifications in a context schema 196. In an example, the system 100 may as described above with reference to FIG. 3, determine changes to the state of the blockchain object 108. In another example, the system 100 may determine whether a message was addressed to the blockchain object 108.

At block 1112, the system 100 may store the determined event in the data repository 179. For example, the system 100 may store the change of state of the blockchain object 108 in the data repository 179. In an example, the system 100 may optionally store all the events from the event stack 104 in the data repository. For example, the storage service 143 may be used to store the events on the event stack 104 to the data repository 179. In another example, post processing service 149 may process the events on the event stack 104 to determine events for storage. For example, the post processing service 149 may categorize the events in the event stack 104 based on the context schema 196. In another example, the post processing service 149 may determine the parameters in an event on the event stack 104 such as the offer price in a blockchain object and the like. The system 100 may store these values in the data repository 179. For example, the system 100 may store the values of contracts for sale of an asset such as a car placed on the blockchain 120.

At block 1114, the system 100 may provide read-write access to the data repository 179 to the analytics service 132. In another example, the system 100 may provide access to the reporting/integration service 134. For example, the analytics service 132 may be a cloud service that is designed to analyze data stored in a database. For example, the analytics service may process data in the database to identify patterns, generate a profile of a parameter of a blockchain object and the like. A parameter of the blockchain object may, for example, be an employee who sells cars at a dealership. In another example, a profile may be a customer profile of a customer on the blockchain, their likes and their dislikes, recent browsing history, recent activity on the blockchain and the like. The analytics service 132 may generate a profile for smart contracts that were used recently and the demand for an asset such as a car or a real estate based on a region, subgroup or the like. The system 100 may thus generate analytics information for blockchain objects using a blockchain analytics service 132 that may be agnostic to the blockchain 120.

In an example, the analytics service may use the context schema 196 to provide additional contextual information about the events from the blockchain 120.

In an example, the system 100 may allow the analytics service 132 to deploy information to the blockchain 120. For example, the analytics service 132 may use cookies to track participants using a signature. In an example, a signature of a participant may include their cryptographic signature, the specifications of their computer, the characteristics of their interaction with the computer and the like. In an example, the blockchain agnostic service such as the analytics service 132 or the reporting/integration service 134 may write to the blockchain 120 using the read-write data repository 179.

The system 100 may receive the request as a write request to the data repository 179. The system 100 may monitor changes to the data repository 179 from the analytics service 132. For example, the blockchain oracle 146 may monitor the changes to the data repository 179 periodically. In an example, the system 100 may generate a message blockchain object to the blockchain 120 that includes the change based on the context schema. For example, the system 100 may generate the message blockchain object addressed to the object that's being changed on the blockchain 120. The blockchain service 188 may deploy the blockchain object 108 to the blockchain 120.

In an example, the blockchain monitor 122 may receive a new block from the blockchain 120 distributed by a node in a peer-to-peer network of nodes publishing the new block based on a consensus algorithm for the blockchain 120. The blockchain monitor 122 may then generate a plurality of events that correspond to blockchain objects in the new block or block update and place them on the event stack 104 for the other services.

In an example, the storage service 143 and/or the post processing service 149 may identify a participant on the blockchain 120. The instructions to determine the parameters of the determined event may include instructions to determine the profile of the participant. For example, the system 100 may identify a plurality of blockchain objects associated with the participant. The system may then generate a profile of the participant based on the plurality of blockchain objects. In an example, the profile of the participant may include the type of blockchain objects associated with the participant, the identity of the participant and the like.

In an example, the analytics service 132 may store the profile associated with the participant in the data repository 179.

In another example, the instructions to determine the parameters of the determined event may include instructions to determine a type of the blockchain object. For example, a blockchain object to sell cars. The system 100 may determine a plurality of blockchain objects associated with the identified type of blockchain object on the blockchain 120. For example, the system 100 may determine the blockchain objects that are intended for selling cars. The system 100 may then generate a profile associated with the type of blockchain object. For example, the system 100 may determine a profile of blockchain objects associated with the selling of cars. The blockchain analytics service 132 may store the profile to the blockchain 120.

In an example, the analytics service may determine a blockchain identity of the participant. The system may then determine a real-world identity of the participant. For example, a service such as Linkedin™ may provide the off-chain identity of the participant. The system 100 may use contextual information from the blockchain 120 such as the role from the context schema 196 to determine the off-chain identity of the participant. The analytics service may then use a brokerage service to obtain the off-chain profile of the participant. The system 100 may then integrate the off-chain profile of the participant with the information from the blockchain 120.

For example, the system 100 may generate a profile from Linkedin™ with information about the transactions of the participant from the blockchain 120. Thus, the system 100 may allow targeted adverting to the participant based on the activities of the participant on the blockchain 120. In an example, the system 100 may generate an advertisement that targets the participant based on the profile of the participant. For example, assume the participant is interested in purchasing a car on the blockchain 120. The system 100 may allocate an advertisement slot that allows advertisement purchases to target participants interested in cars. The system 100 may then receive an advertisement that targets participants that sell cars. The system 100 may then transmit the advertisement for integration with a webpage requested by the participant. For example, the web server accessed by the participant on their browser may allow analytics services to display advertising along with the content requested by the participant. The system 100 may transmit the advertisement for integration with a webpage requested by the participant.

In an example, the system 100 may receive a block update from the blockchain 120. The system 100 may then determine whether the block update includes a blockchain object associated with the participant. In response to a determination that the block update includes a blockchain object associated with the participant, the system 100 may place the blockchain object on the event stack 104. The system 100 may then update the profile associated with the participant.

Figure 12:
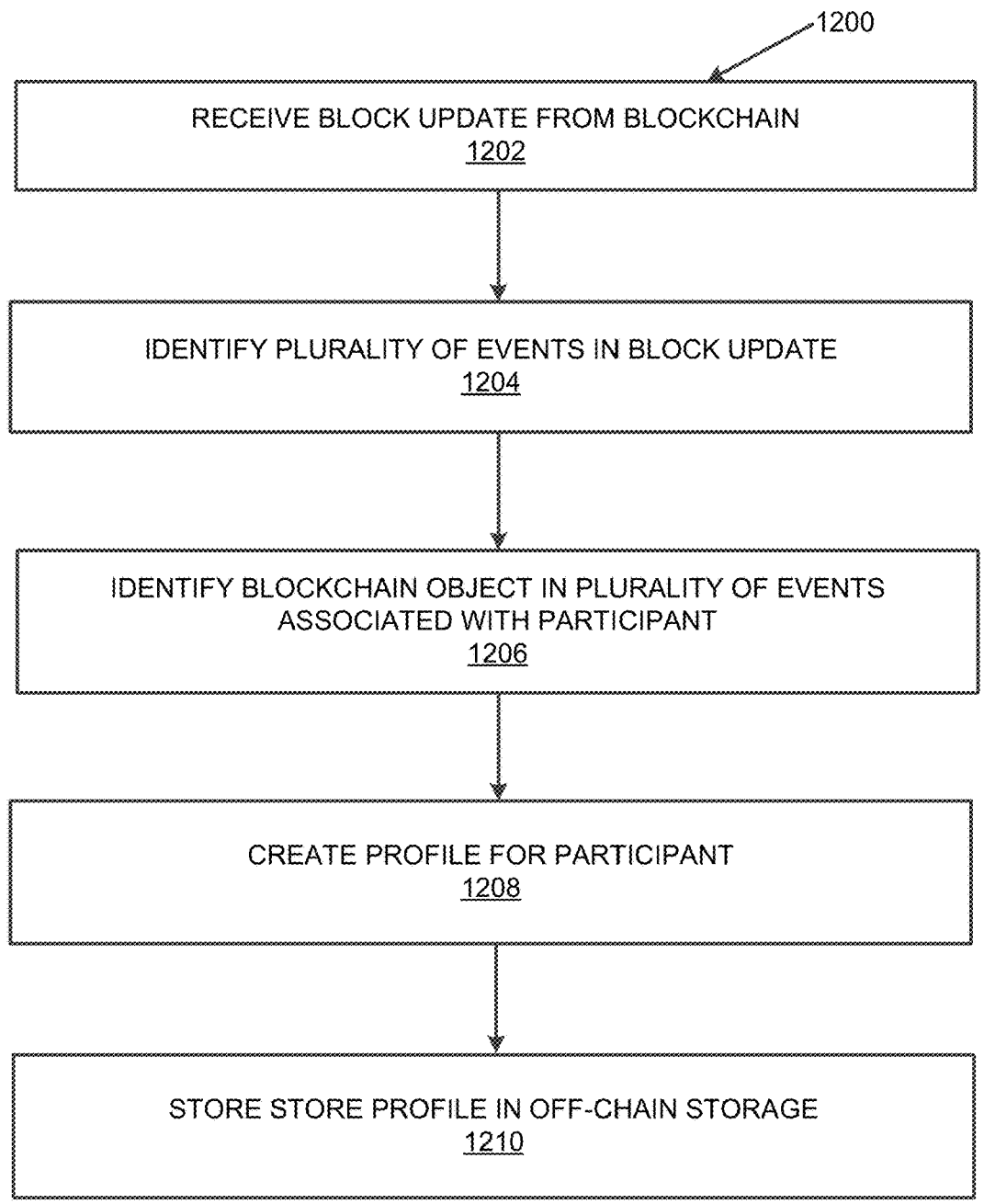

FIG. 12 shows an example of a method 1200 for a blockchain analytics system. The system 100 may allow blockchain analytics to a service on the system 100. At block 1102, the system 100 may receive a block update from the blockchain 120. The block update may include a plurality of events from the blockchain 120.

At block 1204, the system 100 may identify a plurality of events in the block update. The plurality of events may include blockchain objects in the block update. For example, the blockchain monitor 122 may identify the plurality of events in the block update from the blockchain 120.

At block 1206, the system 100 may identify a blockchain object in the plurality of events associated with a participant. For example, the system 100 may use the configuration file 198 to identity a blockchain object associated with the participant. The configuration file 198 may be an instance of the context schema 196. The system 100 may use the information such as the persona 171, the identity service 192 and the like as described above with reference to FIG. 3 to identify the blockchain object associated with the participant.

At block 1208, the system 100 may generate a profile for the participant based on the associated blockchain object. For example, assume the blockchain object relates to the sale of the property. The system 100 may generate a profile of the participant based on the blockchain object parameter or properties. The system 100 may, for example, tag the participant as a seller of the property.

At block 1210, the system 100 may store the profile in an off-chain storage 110 such as the data repository 179. In an example, the analytics service 132 may store the profile of the participant in the data repository 179. In an example, a second block update may be received by the blockchain monitor 122. The system 100 may update the profile based on the second block update.

Figure 13:
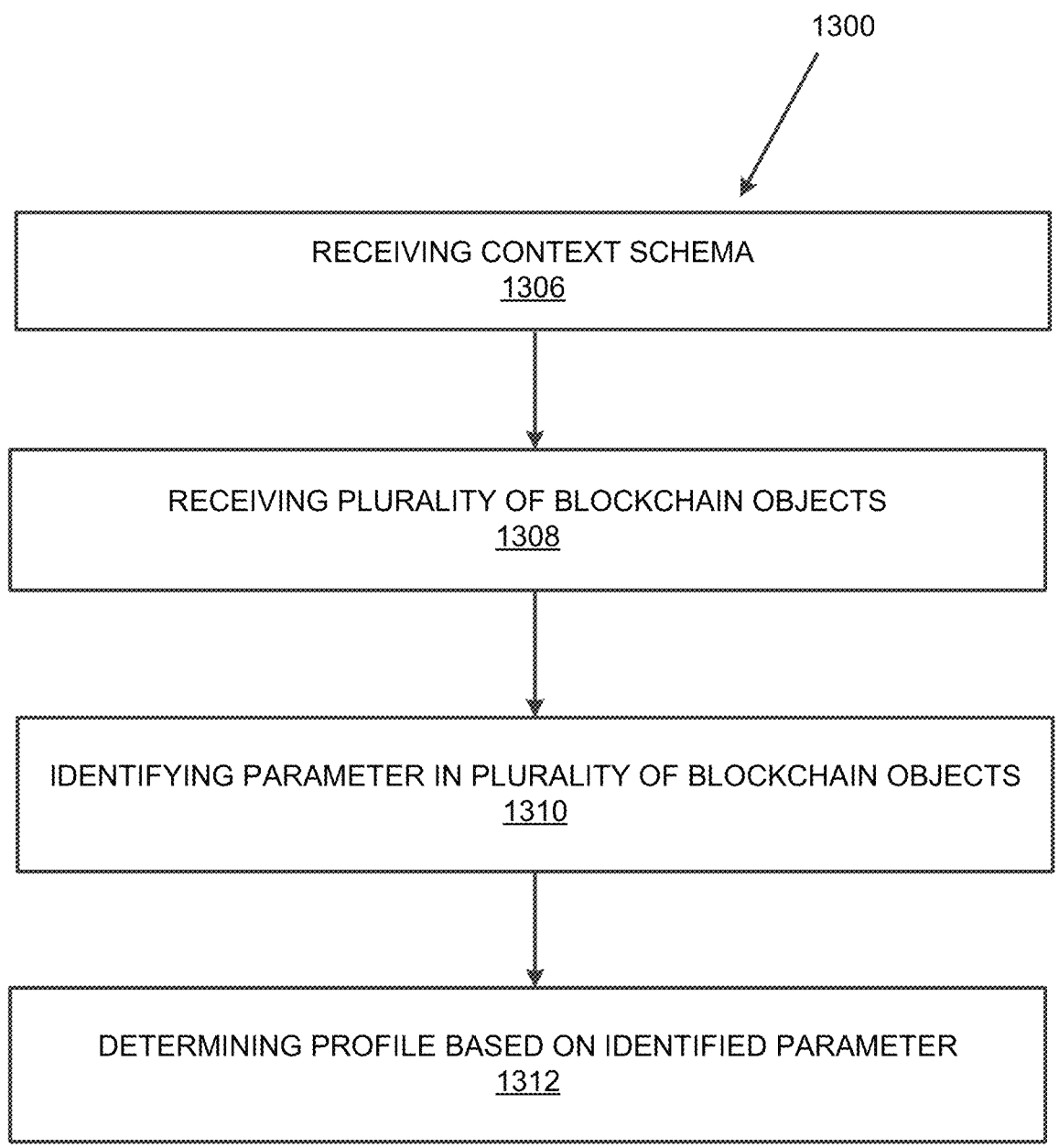

FIG. 13 shows an example of a method 1200 for blockchain analytics. At block 1306, the system 100 may receive a context schema 196 for a blockchain object. For example, the context schema 196 may include a state map describing states of the blockchain object, a personal list of acceptable personas who may interact with the blockchain object in different states and the like.

At block 1308, the system 100 receives a plurality of blockchain objects (e.g., events) from the blockchain 120. As described above with reference to FIG. 3, the blockchain monitor 122 may determine a plurality of events in the block update. The block update may be a new block in the blockchain 120 and may include multiple blockchain objects, each of which is considered an event. The blockchain monitor 122 and/or the input service 115 may place the plurality of events on the event stack 104 for other services to process in the system 100.

At block 1310, the system 100 may identify a parameter in the plurality of blockchain objects based on the context schema. For example, the system 100 may determine the identity of a participant, type of the blockchain object, state of the blockchain object, the persona that may interact with the blockchain object in its current state, the blockchain id, the action of a participant and the like.

At block 1312, the system 100 may determine a profile based on the identified parameter. For example, the analytics service may determine a profile based on the identity of the participant. Similarly, profiles may be determined based on the state of the blockchain contracts, the actions of the participants, the roles of the participants and the like. Although described with reference to the blockchain object 108, the system 100 may monitor thousands of blockchain objects and events that may affect these objects, with multiple participants.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A blockchain analytics system comprising:
   a hardware processor; and
   a non-transitory computer readable medium storing machine-readable instructions that when executed by the processor cause the processor to:
   receive a plurality of events from a blockchain;
   place the plurality of events on an event stack;
   determine an event in the plurality of events that matches specifications in a context schema;
   determine parameters of the determined event;
   store the determined parameters in a data repository;
   provide read-write access to the data repository to a blockchain agnostic service;
   determine a blockchain identity associated with a blockchain object;
   determine an off-chain identity associated with the blockchain identity;
   generate an integrated profile that combines the off-chain and blockchain identities;
   determine a further blockchain identity associated with a participant, wherein the further blockchain identity is based on public key and private key cryptography;
   determine a further off-chain identity associated with the further blockchain identity; and
   generate a profile for the participant that integrates an off-chain profile of the participant with information from the blockchain.

2. The system according to claim 1, wherein the machine-readable instructions are executed by the processor to:
   identify a write request to the data repository from the blockchain agnostic service, wherein the write request is based on the read-write access to the data repository;
   determine a change to the data repository;
   determine a message blockchain object including the change based on the context schema; and
   deploy the message blockchain object to the blockchain.

3. The system according to claim 1, wherein the machine-readable instructions to determine parameters of the determined event are executed by the processor to:
   determine the participant on the blockchain;
   determine a plurality of blockchain objects associated with the participant; and
   determine the profile associated with the participant.

4. The system according to claim 1, wherein the machine-readable instructions are executed by the processor determine a type of blockchain object:
   determine a plurality of blockchain objects associated with the type of blockchain object; and
   determine a profile associated with the type of blockchain object.

5. The system according to claim 1, wherein the blockchain object includes a cryptlet that is executable in a secure enclave.

6. The system according to claim 1, wherein an event of the plurality of events includes a message addressed to the blockchain object that is designated a first blockchain object, and wherein the message includes a second blockchain object addressed to the first blockchain object.

7. The system according to claim 1, wherein the machine-readable instructions when executed by the processor further cause the processor to:
   generate a hash of the blockchain object;
   store the blockchain object and the hash in an off-chain storage; and
   verify, based on the hash, whether the blockchain object stored on the blockchain is same as the blockchain object stored in the off-chain storage.

8. The system according to claim 1, wherein the machine-readable instructions when executed by the processor further cause the processor to:
   generate a hash of the blockchain object;
   store the blockchain object and the hash in an off-chain storage; and
   store the hash on the blockchain without storing the blockchain object on the blockchain.

9. A blockchain analytics system comprising:
   a hardware processor; and
   a non-transitory computer readable medium storing machine-readable instructions that when executed by the processor cause the processor to:
   retrieve blockchain objects from a blockchain;
   determine parameters of blockchain objects retrieved from the blockchain;
   store determined parameters in a data repository;
   generate a machine learning blockchain analytics model based on the determined parameters;
   determine a blockchain identity associated with a blockchain object;
   determine an off-chain identity associated with the blockchain identity;
   generate an integrated profile that combines the off-chain and blockchain identities;

determine a further blockchain identity associated with a participant, wherein the further blockchain identity is based on public key and private key cryptography;

determine a further off-chain identity associated with the further blockchain identity; and generate a profile for the participant that integrates an off-chain profile of the participant with information from the blockchain.

10. The system according to claim 9, wherein the machine-readable instructions are executed by the processor to:

generate a visualization based on determined parameters.

11. The system according to claim 9, wherein the machine-readable instructions are executed by the processor to:

determine an anomaly in a block update;

deploy an event to an event stack; and trigger, based on the event, a change in a state of the blockchain object.

12. The system according to claim 9, wherein the machine-readable instructions are executed by the processor to:

identify a pattern in a blockchain update, based on the machine learning blockchain analytics model;

generate a message blockchain object based on the identified pattern; and deploy the message blockchain object to the blockchain.

13. The system according to claim 9, wherein the machine-readable instructions are executed by the processor to:

identify a pattern in a block update, based on the blockchain analytics model; and alert the participant.

14. The system according to claim 9, wherein the machine-readable instructions to determine parameters of blockchain objects retrieved from the blockchain are executed by the processor to:

identify parameters of blockchain objects based on a context schema.

15. A computer-implemented method for blockchain analytics, the method comprising:

receiving a context schema for a blockchain object, wherein the context schema comprises:

a state map describing states of the blockchain object; and a persona list of acceptable personas that can interact with the blockchain object in different states;

receiving a plurality of blockchain objects from a blockchain;

identifying a parameter in the plurality of blockchain objects based on the context schema;

determining a profile based on the identified parameter;

determining a blockchain identity associated with a blockchain object;

determining an off-chain identity associated with the blockchain identity;

generating an integrated profile that combines the off-chain and blockchain identities;

determining a further blockchain identity associated with a participant, wherein the further blockchain identity is based on public key and private key cryptography;

determining a further off-chain identity associated with the further blockchain identity; and generating a further profile for the participant that integrates an off-chain profile of the participant with information from the blockchain.

16. The computer-implemented method according to claim 15, wherein the parameter is an identity of the participant.

17. The computer-implemented method according to claim 15, wherein the parameter is a type of the blockchain object.

18. The computer-implemented method according to claim 15, wherein the parameter is a state of the blockchain object.

19. The computer-implemented method according to claim 15, wherein the parameter is a persona from the acceptable personas that is authorized to interact with the blockchain object.

20. The computer-implemented method according to claim 15, wherein the parameter is a blockchain id.

* * * * *